United States Patent
Ichikawa et al.

(10) Patent No.: US 12,333,039 B2
(45) Date of Patent: Jun. 17, 2025

(54) SECRET HASH TABLE CONSTRUCTION SYSTEM, REFERENCE SYSTEM, METHODS FOR THE SAME

(71) Applicant: NIPPON TELEGRAPH AND TELEPHONE CORPORATION, Tokyo (JP)

(72) Inventors: Atsunori Ichikawa, Musashino (JP); Koki Hamada, Musashino (JP); Ryo Kikuchi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 533 days.

(21) Appl. No.: 17/792,145

(22) PCT Filed: Jan. 16, 2020

(86) PCT No.: PCT/JP2020/001218
§ 371 (c)(1),
(2) Date: Jul. 12, 2022

(87) PCT Pub. No.: WO2021/144905
PCT Pub. Date: Jul. 22, 2021

(65) Prior Publication Data
US 2023/0039723 A1  Feb. 9, 2023

(51) Int. Cl.
*G06F 21/62* (2013.01)
*G06F 16/901* (2019.01)
(Continued)

(52) U.S. Cl.
CPC ...... *G06F 21/6227* (2013.01); *G06F 16/9014* (2019.01); *G06F 21/14* (2013.01);
(Continued)

(58) Field of Classification Search
CPC ..... H04L 9/3236; H04L 9/0869; H04L 9/088; H04L 9/0894; H04L 2209/08;
(Continued)

(56) References Cited

U.S. PATENT DOCUMENTS

| 2014/0214855 A1* | 7/2014 | Attaluri | G06F 16/2255 |
| | | | 707/747 |
| 2015/0186627 A1* | 7/2015 | Teuwen | G06F 21/14 |
| | | | 713/190 |

(Continued)

OTHER PUBLICATIONS

Bucket Oblivious Sort: An Extreme Simple Oblivious Sort, Gilad Asharov et al., Apr. 29, 2021, pp. 1-10 (Year: 2021).*
Goldreich et al., "Software Protection and Simulation on Oblivious RAMs", J. ACM, vol. 43, No. 3, TR-93-072, Nov. 1993, pp. 431-473.
(Continued)

*Primary Examiner* — Shaqueal D Wade-Wright
(74) *Attorney, Agent, or Firm* — XSENSUS LLP

(57) ABSTRACT

A server determines an array [[addr]] indicating a storage destination of each piece of data, generates an array of concealed values, and connects the generated array to the array [[addr]] to determine an array [[addr']]. The server generates a sort permutation $[[\sigma_1]]$ for the array, applies the sort permutation $[[\sigma_1]]$ to the array [[addr']], and converts the array [[addr']] into an array with a sequence composed of first Z elements set to [[i]] followed by $\alpha_i$ elements set to [[B]]. The server generates a sort permutation $[[\sigma_2]]$ for the converted array [[addr']], generates dummy data, imparts the generated dummy data to the concealed data sequence, applies the sort permutations $[[\sigma_1]]$ and $[[\sigma_2]]$ to the data array imparted with the dummy data, and generates, as a secret hash table, a data sequence obtained by deleting the last N pieces of data from the sorted data array.

10 Claims, 11 Drawing Sheets

(51) Int. Cl.
*G06F 21/14* (2013.01)
*H04L 9/08* (2006.01)
*H04L 9/32* (2006.01)
*G06F 12/1018* (2016.01)

(52) U.S. Cl.
CPC ............ *H04L 9/0869* (2013.01); *H04L 9/088* (2013.01); *H04L 9/0894* (2013.01); *H04L 9/3236* (2013.01); *G06F 12/1018* (2013.01); *H04L 2209/08* (2013.01)

(58) Field of Classification Search
CPC .. G06F 12/1018; G06F 12/1441; G06F 16/90; G06F 21/62; G06F 21/6227; G06F 16/9014; G06F 21/14; G06F 21/6254; G09C 1/00
See application file for complete search history.

(56) References Cited

U.S. PATENT DOCUMENTS

2022/0114110 A1* 4/2022 Hamada .............. G06F 12/1408
2024/0028576 A1* 1/2024 Ichikawa ............ G06F 16/2255

OTHER PUBLICATIONS

Goodrich et al., "Privacy-Preserving Access of Outsourced Data via Oblivious RAM Simulation", In Automata, Languages and Programming, May 2, 2011, pp. 1-21.
Chan et al., "Oblivious Hashing Revisited, and Applications to Asymptotically Efficient ORAM and OPRAM", Cryptology ePrint Archive, Report 2017/924, International Association for Cryptologic Research 2017, pp. 660-690.

* cited by examiner

SECRET HASH TABLE CONSTRUCTION SYSTEM, REFERENCE SYSTEM, METHODS FOR THE SAME

CROSS-REFERENCE TO RELATED APPLICATION

The present application is based on PCT filing PCT/JP2020/001218, filed Jan. 16, 2020, the entire contents of which are incorporated herein by reference.

TECHNICAL FIELD

The present invention relates to a technique for causing a server to construct a hash table while keeping a table structure concealed from the server.

BACKGROUND ART

A hash table is a data structure in which a key value of data is encoded by a hash function or the like and the key value is associated with an address value in a data array, so that data can be searched for at high speed by using the key value. This is useful, for example, when data is entrusted to an external server or the like and a search using a key value is desired at any time. However, ordinary hash tables are not prepared for data concealment, and thus, there is a problem in that, for example, a server entrusted with data (or a hash table) from a user may identify a table structure and thereby observe an access tendency of the user. The secret hash tables of NPLs 1, 2, and 3 are existing method for solving such a problem. A secret hash table is a technique for causing a server to construct a hash table while keeping a table structure concealed from the server, and allows for concealing an access tendency of a user from the server. Obviously, an example of a method for constructing a secret hash table is a method in which a user encrypts all data, constructs a hash table, and entrusts the hash table to the server. However, in this case, a storage area of the user needs to be O(N) when the number of pieces of data is N. All of the above-mentioned NPLs 1, 2, and 3 describe methods of constructing a secret hash table on a server by a user-server coordination protocol, under the assumption that the server has all encrypted data, and in this case, advantageously, it is only required that the storage area of the user be O(1).

CITATION LIST

Non Patent Literature

NPL 1: O. Goldreich and R. Ostrovsky., "Software protection and simulation on oblivious RAMs", J. ACM, 43(3): 431-473, May 1996.
NPL 2: M. T. Goodrich and M. Mitzenmacher., "Privacy-preserving access of outsourced data via oblivious RAM simulation", In Automata, Languages and Programming, pages 576587, Berlin, Heidelberg, 2011. Springer Berlin Heidelberg.
NPL 3: T-H. H. Chan, Y. Guo, W-K. Lin, and E. Shi., "Oblivious hashing revisited, and applications to asymptotically efficient ORAM and OPRAM", Cryptology ePrint Archive, Report 2017/924, 2017.

SUMMARY OF THE INVENTION

Technical Problem

However, even though the storage area of the user is only O(1) in a method of constructing a secret hash table in the related art, there is a problem in that the number of pieces of data communicated between the user and the server is O(N log N). In reality, a communication environment and a computing performance on the user side are not always sufficient, and thus, it is desirable to reduce the cost mentioned above as much as possible.

An object of the present invention is to provide a secret hash table construction system in which a plurality of servers are used to obtain a user-server communication cost of O(1), and also to provide a corresponding reference system and methods of the secret hash table construction system and the reference system. Note that the number of pieces of data communicated between servers in the present invention is O(N), and further, O(N log N)-bit communication is required as accompanying information.

Means for Solving the Problem

In order to solve the problems mentioned above, according to one aspect of the present invention, a secret hash table construction system includes a plurality of servers and constructs a secret hash table by a coordination protocol of the plurality of servers by using secure computation. The secret hash table has a data structure configured to have B address values and store a maximum of Z pieces of data for each of the B address values. The server includes a storage destination array calculation unit configured to determine, for a concealed data sequence $[[A]]$, a pseudo-random function value $[[addr_i]]$ by using a key $[[k_i]]$ of each piece of data of the concealed data sequence $[[A]]$ as input of a pseudo-random function and a secret key $[[s]]$ as a secret key of the pseudo-random function, to determine an array $[[addr]]$ indicating a storage destination of each piece of the data, a concealed value array connection unit configured to generate an array $[[addr_{dummy}]]$ of concealed values and connect the generated array $[[addr_{dummy}]]$ to the array $[[addr]]$ to determine an array $[[addr']] \leftarrow [[addr]] \| [[addr_{dummy}]]$, a sort permutation generation application unit configured to generate a sort permutation $[[\sigma_1]]$ for the array $[[addr']]$ by using values included in the array $[[addr']]$ as keys and apply the sort permutation $[[\sigma_1]]$ to the array $[[addr']]$, a conversion unit configured to convert the array $[[addr']]$ into an array with a sequence composed of first Z elements set to $[[i]]$ followed by w elements set to $[[B]]$, $\alpha_i$ being the number of i included in the array $[[addr]]$, a sort permutation generation unit configured to generate a sort permutation $[[\sigma_2]]$ for the converted array $[[addr']]$ by using values included in the converted array $[[addr']]$ as keys, and a table generation unit configured to generate dummy data $[[empty]]$ for a concealed data sequence $[[\sim A]]$ corresponding to the concealed data sequence $[[A]]$, impart the generated dummy data $[[empty]]$ to the concealed data sequence $[[\sim A]]$, apply the sort permutations $[[\sigma_1]]$ and $[[\sigma_2]]$ to the data array imparted with the dummy data, and generate, as a secret hash table, a data sequence obtained by deleting the last N pieces of data from the sorted data array.

In order to solve the problems mentioned above, according to another aspect of the present invention, a secret hash table construction system includes a plurality of servers and constructs a secret hash table by a coordination protocol of the plurality of servers by using secure computation. The secret hash table has a data structure configured to have B address values and store a maximum of Z pieces of data for each of the B address values. The server includes a storage destination array calculation unit configured to determine, for a concealed data sequence $[[A]]$, a pseudo-random function value $[[addr^0_i]]$ by using a key $[[k_i]]$ of each piece of data of the concealed data sequence [[A]] as input of a pseudo-random function and a secret key [[$s^0$]] as a secret key of the pseudo-random function, to determine an array [[$addr^0$]] indicating a storage destination of each piece of the data, and further configured to determine, for the concealed data sequence [[A]], a pseudo-random function value [[$addr^1_i$]] by using the key [[$k_i$]] of each piece of the data of the concealed data sequence [[A]] as input of the pseudo-random function and a secret key [[$s^1$]] as a secret key of the pseudo-random function, to determine an array [[$addr^1$]] indicating a storage destination of each piece of the data, a concealed value array generation unit configured to generate arrays [[$addr^0_{dummy}$]] and [[$addr^1_{dummy}$]] of concealed values, a tag imparting unit configured to impart tags [[1]], . . . , [[N+BZ]] to an array [[A']] obtained by connecting B×Z pieces of dummy data to the concealed data sequence [[A]], an array creation unit configured to create an array [[T]]=([[$t_1$]], . . . , [[$t_{N+BZ}$]]), where [[$t_i$]]=([[i]], [[$addr^0_i$]], [[$addr^1_i$]], [[d]]), [[i]] is each of the tags, [[$addr^0_i$]] and [[$addr^1_i$]] are i-th elements of the arrays [[$addr^0$]] and [[$addr^1$]], respectively, and [[d]] is a concealed value indicating whether data is dummy data, a sort unit configured to repeat the following processing (i) to (ix) Z times, (i) newly generating a secret random permutation for the array [[T]] and applying the new secret random permutation to the array [[T]], (ii) generating a sort permutation using an element [[$addr^0_i$]] of the array [[$addr^0$]] as a key value and applying the generated sort permutation to the array [[T]], (iii) creating, for a sorted array [[T']], a secret array [[M]] obtained by marking data located at the beginning for each address value, (iv) creating a sort permutation for the array [[M]] and applying the created sort permutation to [[T']], (v) separating the last B pieces of data from [[T']], retaining the B pieces of data as an array [[$L^0_j$]], and retaining the array shortened by B as [[T"]], (vi) sorting [[T"]] by using [[$addr^1_i$]] as a key value, creating, for the sorted array, a secret array obtained by marking the data located at the beginning for each address value, creating a sort permutation for the created array, and applying the created sort permutation to [[T"]], (vii) separating the last B pieces of data from [[T"]] and retaining the B pieces of data as an array [[$L^1_j$]], (viii) comparing respective elements of the arrays [[$L^0_j$]] and [[$L^1_j$]] in order from the beginning and exchanging elements when dummy data is present in $B^0_j$, and (ix) connecting [[$L^1_j$]] to the array [[T"]], setting the connected array as a new array [[T]], and returning to processing (i), a restoration unit configured to arrange Z arrays [[$L^0_j$]] having a length B to obtain an array having a size of B×Z, calculate and restore a secret pseudo-random permutation for tags of each of the arrays, calculate a secret pseudo-random permutation for tags of the array [[A']], apply the random permutation to [[A']], and then, restore the tags, and a table generation unit configured to arrange, in a hash table, only elements for which the tags corresponding to the array [[A']] and the tags corresponding to the table obtained by arranging the Z arrays [[$L^0_j$]] having the length B coincide, and remove remaining elements to generate a secret hash table.

Effects of the Invention

According to the present invention, a secret hash table that can achieve a user-server communication cost of O(1) can be constructed.

DESCRIPTION OF EMBODIMENTS

Figure 1:
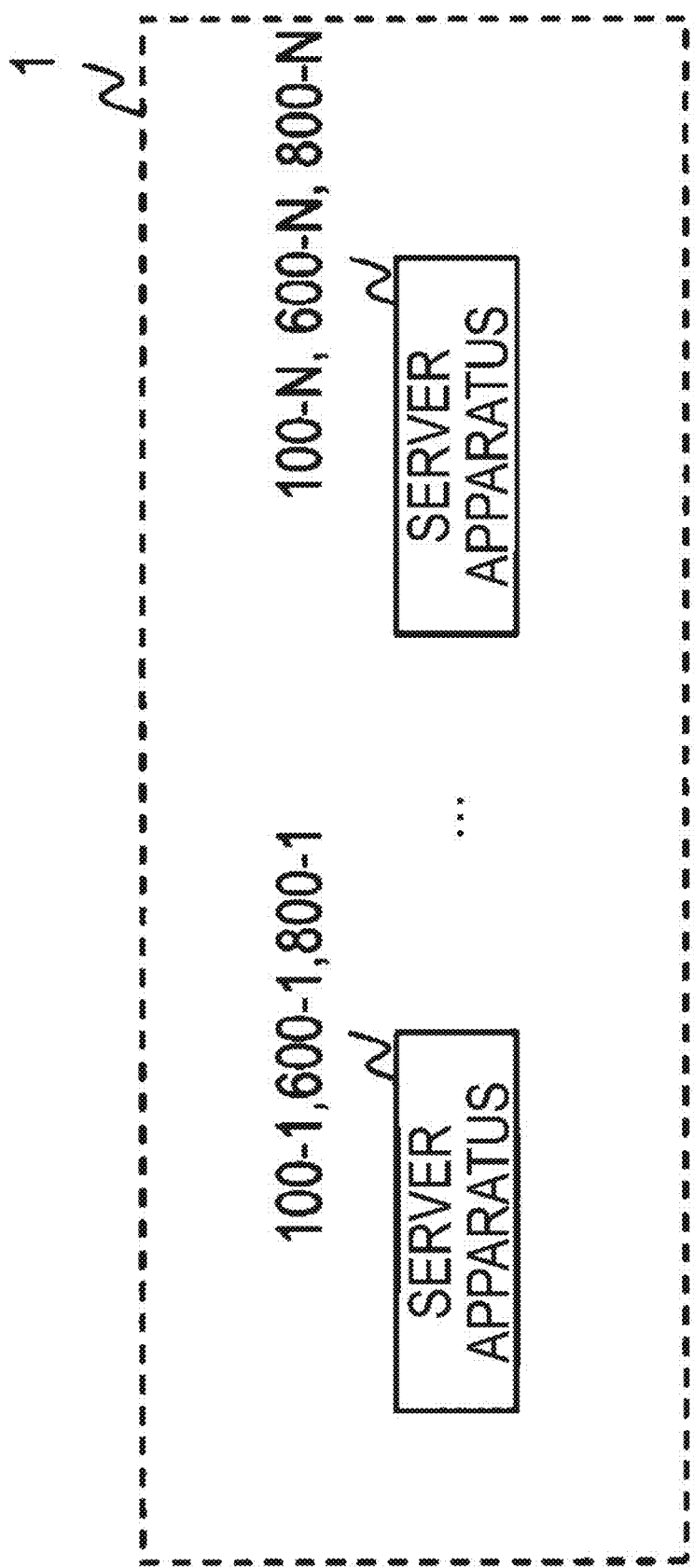
FIG. 1 is a diagram illustrating an exemplary configuration of a secret hash table construction system according to first, sixth, and eighth embodiments.

Embodiments of the present invention are described below. Note that in the drawings used for the following description, the components with the same functions and the steps for the same processing operations are denoted with the same reference numerals, and the overlapping description is omitted. Furthermore, in the following description, it is assumed that processing performed for each element of a vector or a matrix is applied to all elements of the vector or the matrix unless otherwise specified.

Points of the Invention

The present invention allows for construction of a secret hash table by using secure computation, without communicating with a user. In this case, an operation with respect to a data body is reduced and a main target of the operation is an accompanying key value or the like, and thus, the efficiency is improved.

First Embodiment

The present embodiment is a coordination protocol of a plurality of servers, based on secure computation. The existing technology on which the present embodiment is based will be described below.

Concealment and Restoration

In the following, a concealed value of a value x is expressed as [[x]], processing x→[[x]] is referred to as a concealment of x, and processing [[x]]→x is referred to as a restoration of x. It is to be noted that because double brackets are typically used in patent amendments to delete the subject matter between the double brackets, the claims are written to use double parenthesis and instead of double brackets used throughout the specification. Therefore, double parenthesis within the claims mean the same as double brackets described herein. Examples of concealment and restoration processing that can be used in the present embodiment include a secret sharing scheme (Reference NPLs 1 and 2), but any method that satisfies a similar function and safety may be used.

(Reference NPL 1) A. Shamir., "How to share a secret", Commun. ACM, Vol. 22, No. 11, pp. 612-613, 1979.

(Reference NPL 2) M. Ito, A. Saito, and T. Nishizeki., "Secret sharing schemes realizing general access structures", Proceedings of the IEEE Global Telecommunication Conference, Globecom 87, pp. 99-102, 1987.

Basic Operation

The addition, subtraction, and multiplication of concealed values are expressed as follows.

$$[[a+b]] \leftarrow [[a]]+[[b]], [[a-b]] \leftarrow [[a]]-[[b]], [[a \times b]] \leftarrow [[a]] \times [[b]].$$

Assuming that a and b are in a space expressed by p bits, the addition and subtraction can be performed at a communication cost of 0, and the multiplication can be performed at a communication cost of O(p) in Reference NPL 3.

(Reference NPL 3) Naoto Kiribuchi, Dai Ikarashi, Koki Hamada, and Ryo Kikuchi: "MEVAL3: A Library for Programmable Secure Computation," Symposium on Cryptography and Information Security (SCIS), 2018 Proceedings (2018).

Comparison

A comparison between concealed values is expressed below.

$$[[c]] \leftarrow [[[a]]=?[[b]]], [[d]] \leftarrow [[[a]] \leq ?[[b]]].$$

Here, c and d are 1-bit numbers representing results of equality/inequality determinations of a and b. Assuming that a and b are in a space expressed by p bits, the comparison can be performed at a communication cost of O(p) in Reference NPL 3.

Inner Product

An inner product of vectors $[[a]]=([[a_0]], \ldots, [[a_{N-1}]])$ and $[[b]]=([[b_0]], \ldots, [[b_{N-1}]])$ of concealed values is expressed as follows.

$$[[c]] \leftarrow <[[a]], [[b]]>.$$

Assuming that each element of the vectors a and b is in a space expressed by p bits, the inner product can be obtained at a communication cost of O(p) in Reference NPL 3.

Random Permutation Generation

A secret random permutation in which a data sequence $[[A]]=([[a_0]], \ldots, [[a_{N-1}]])$ is shuffled is represented by $[[\pi]]$. In Reference NPL 3, permutation generation can be performed at a communication cost of O(N log N).

Permutation Application

Processing of applying a secret permutation $[[\pi]]$ to the data sequence $[[A]]=([[a_0]], \ldots, [[a_{N-1}]])$ is expressed as follows.

$$[[B]] \leftarrow \text{Apply}([[\pi]], [[A]]).$$

Here, for $[[B]]=([[b_0]], \ldots, [[b_{N-1}]])$, the following equation always satisfied.

$$b_i = a_{\pi^{-1}(i)} \quad [\text{Math. 1}]$$

Note that the permutation $[[\pi]]$ is expressed by a vector, $\pi(i)$ is the i-th element of the permutation $[[\pi]]$, and $\pi^{-1}(i)$ represents an inverse function of $\pi(i)$. When each $a_i$ is in a space represented by p bits, the permutation application can be performed at a communication cost of O(Np) in Reference NPL 3.

Stable Sorting

A data sequence $[[A]]=([[a_0]], \ldots, [[a_{N-1}]])$; $[[a_i]]=([[k_i]], [[v_i]])$ is assumed to be an array of data composed of a key $[[k_i]]$ and a value $[[v_i]]$. At this time, stable sorting of the data sequence is expressed as follows.

$$[[\sigma]] \leftarrow \text{Sort}([[k_0]], \ldots, [[k_{N-1}]]), [[B]] \leftarrow \text{Apply}([[\sigma]], [[A]]).$$

Here, σ is a permutation representing a stable sorting by using a key $k_i$, and B is a data sequence obtained by applying the permutation σ to A. Assuming that the key $k_i$ is p bits in length and the entire data $a_i$ is m bits in length, stable sort permutation generation can be performed at cost of O(pN log N), and permutation application can be performed at a cost of O(Nm) in Reference NPL 3. In particular, when p=O(log N), permutation generation cost is O(N log² N).

Range Prefix Sum A data sequence $[[A]]=([[a_0]], \ldots, [[a_{N-1}]])$; $[[a_i]]=([[k_i]], [[v_i]])$ is assumed to be an array of data composed of a key $[[k_i]]$ and a value $[[v_i]]$. Here, an operation referred to as range prefix sum is expressed as follows.

$$[[B]] \leftarrow \text{RPS}([[A]]).$$

Here, $[[B]]=([[b_0]], \ldots, [[b_{N-1}]])$ is given, and each $b_i$ satisfies the following:

In i∈{0, . . . , N−1}, it is assumed that i' is a minimum value that satisfies $k_{i'}=k_{i'+1}=\ldots=k_i$; and $b_i = \Sigma_{j=i'}^{i} v_j = \Sigma i' v_j$.

In summary, range prefix sum is an operation in which the sum of values from the i'-th value to the i-th value of data having the same key value is calculated as $b_i$, and an array of $b_i$ is output as $[[B]]$. According to Reference NPL 4, this operation can be performed at a communication cost of O(N log N).

(Reference NPL 4): K. Nayak, X. S. Wang, S. Ioannidis, U. Weinsberg, N. Taft, and E. Shi., "GraphSC: Parallel Secure Computation Made Easy", in IEEE S & P, 2015.

Pseudo-Random Function

Values a and s are assumed to be an input and a secret key of a pseudo-random function. An operation of calculating secret pseudo-random values for the concealed values [[a]] and [[s]] is expressed below. $[[r]] \leftarrow \text{PRF}([[a]], [[s]])$.

In this secure computation processing, the universal hash function of Reference NPL 5 or the block encryption of Reference NPL 6 can be utilized, for example.

(Reference NPL 5) L. Carter and M. N. Wegman., "Universal classes of hash functions", J. Comput. Syst. Sci., 18(2): 143-154, 1979.

(Reference NPL 6): K. Chida, K. Hamada, D. Ikarashi, R. Kikuchi, and B. Pinkas., "High-throughput secure AES computation", In WAHC@CCS 2018, pages 13-24, 2018.

Secret Hash Table Construction System According to First Embodiment

FIG. 1 illustrates an exemplary configuration of a secret hash table construction system according to the present embodiment. A secret hash table construction system 1 includes N server apparatuses. At least M server apparatuses 100-m of the N server apparatuses 100-n construct a secret hash table by a coordination protocol based on secure computation. Note that, here, n=1, 2, . . . , N, N is any integer equal to or greater than 2, and M is any integer from 2 to N.

Figure 2:
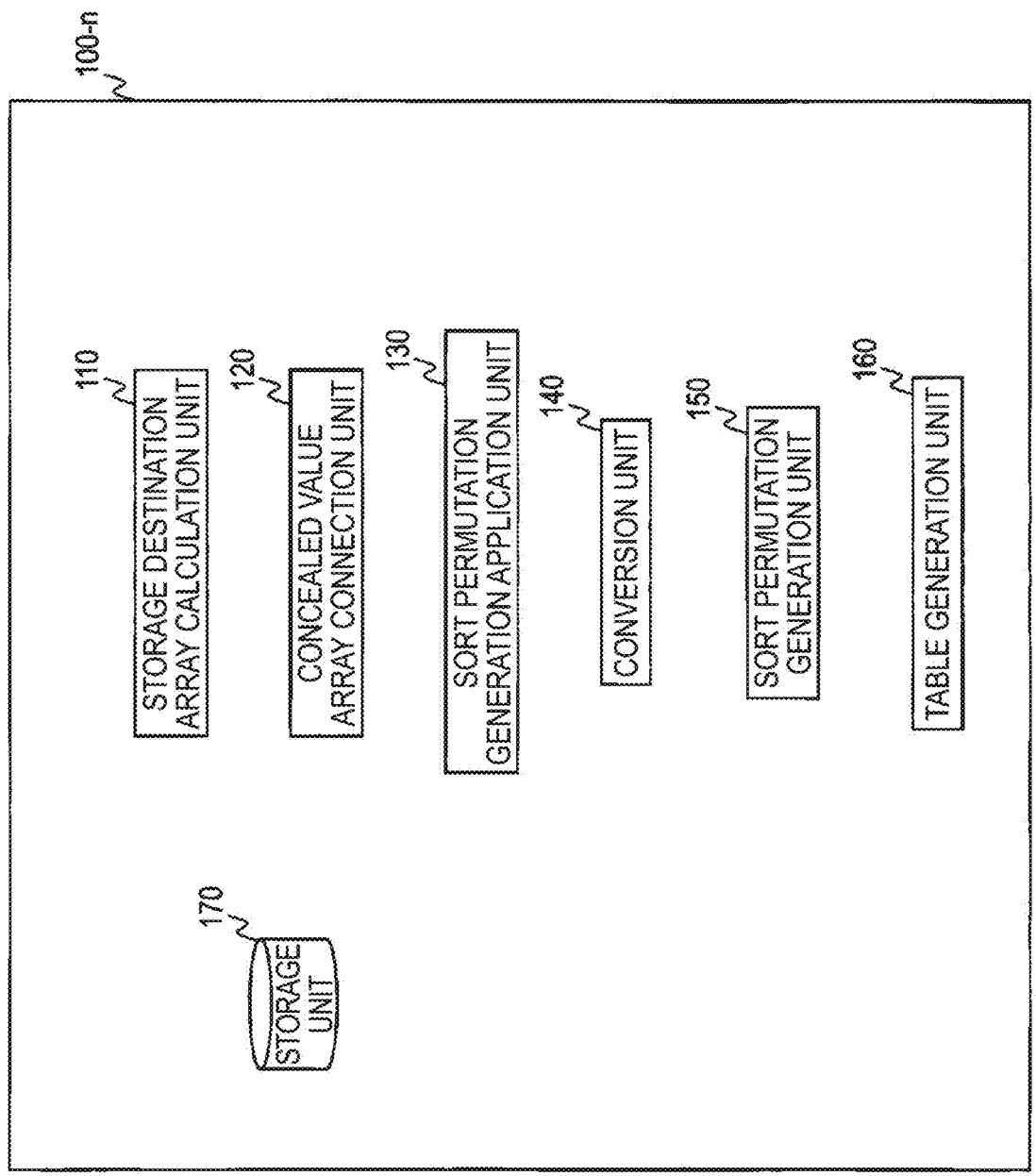
FIG. 2 is a functional block diagram of a server apparatus according to the first embodiment.
Figure 3:
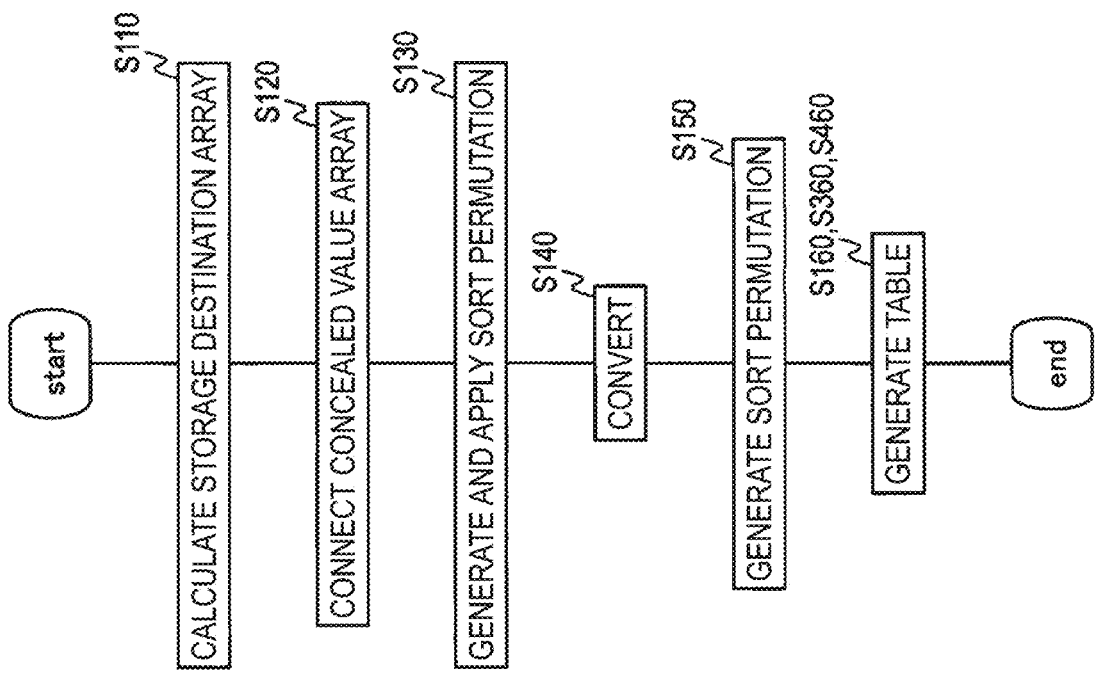
FIG. 3 is a diagram illustrating an example of a flowchart of processing of a secret hash table construction system according to first, third, and fourth embodiments.

FIG. 2 illustrates a functional block diagram of the server apparatus 100-n, and FIG. 3 illustrates an example of a flowchart of processing of a secret hash table construction system.

The server apparatus 100-n includes a storage destination array calculation unit 110, a concealed value array connection unit 120, a sort permutation generation application unit 130, a conversion unit 140, a sort permutation generation unit 150, a table generation unit 160, and a storage unit 170. Each unit of the at least M server apparatuses 100-m of the N server apparatuses 100-n performs each processing by a coordination protocol, based on secure computation, but in the following description, it is simply assumed that each unit performs the processing.

The server apparatus is, for example, a special apparatus configured by loading a special program on a publicly known or dedicated computer including a central processing unit (CPU), a main storage apparatus (random access memory (RAM)), and the like. The server apparatus executes each processing under the control of the central processing unit, for example. Data input to the server apparatus and data obtained in each processing are stored in the main storage apparatus, for example. Data stored in the main storage apparatus is read to the central processing unit as needed and utilized for other processing. At least a part of each processing unit of the server apparatus may include hardware such as an integrated circuit. Each storage unit provided in the server apparatus may include a main storage apparatus such as a random access memory (RAM), or middleware such as a relational database and a key-value store. However, each storage unit does not necessarily need to be provided inside the server apparatus. Each storage unit may be configured by an auxiliary storage apparatus including a hard disk, an optical disk, or a semiconductor memory element such as a flash memory, and may be provided outside the server apparatus.

In the present embodiment, a basic method of constructing a secret hash table by using data $a_i$ composed of a key $k_i$ and a value $v_i$ is described. It is assumed that the server retains a concealed data sequence $[[A]]=([[a_0]], \ldots, [[a_{N-1}]])$ in the storage unit 170. Here, it is assumed that $k_i \neq k_j$ for all $i \neq j$. Furthermore, in the following, it is assumed that a secret key $[[s]]$ and a secret random permutation $[[\pi]]$ are generated in advance. However, the secret key and the secret random permutation may be generated sequentially while the protocol is performed. It is assumed that the secret hash table constructed in the present embodiment is a data array having a size B×Z, and in other words, is a data structure in which a maximum of Z pieces of data can be stored for each of B address values. Additionally, it is assumed that the pseudo-random function used in the present embodiment always satisfies $PRF([[k]], [[s]]) \in \{0, \ldots, B-1\}$.

At this time, the secret hash table construction system 1 constructs a secret hash table as described below.

1. First, the server apparatus 100-$n$ extracts the concealed data sequence $[[A]]$ from the storage unit 170, applies a random permutation to $[[A]]$ to obtain $[[\~A]] \leftarrow$ Apply$([[\pi]], [[A]])$, and outputs $[[\~A]]$. However, it is assumed that this operation does not need to be performed, depending on a state of the $[[A]]$ to be input and the safety to be satisfied.

2. The storage destination array calculation unit 110 extracts the concealed data sequence $[[A]]$ from the storage unit 170, and calculates and outputs an array $[[addr]]=([[addr_0]], \ldots, [[addr_{N-1}]])$; $[[addr_i]] \leftarrow PRF([[k_i]], [[s]])$ indicating a storage destination of each piece of data, for the $[[A]]$ (S110). Subsequently, a sort permutation is generated by using the values of this array as key values and used to construct the hash table.

3. The concealed value array connection unit 120 generates a concealed value array $[[addr_{dummy}]]=([[0]], \ldots, [[0]], [[1]], \ldots, [[1]], \ldots, [[B-1]], \ldots, [[B-1]])$. This array is a concealed value of an array having, for each value of $i=0, \ldots, B-1$, a sequence of Z elements set to the same value. The concealed value array connection unit 120 receives the array $[[addr]]$ from the storage destination array calculation unit 110, connects $[[addr_{dummy}]]$ to the end of $[[addr]]$ to obtain $[[addr']] \leftarrow [[addr]] \| [[addr_{dummy}]]$, and outputs $[[addr']]$ (S120).

4. The sort permutation generation application unit 130 receives the array $[[addr']]$ from the concealed value array connection unit 120, uses a value included in $[[addr']]$ as a key to generate a sort permutation $[[\sigma_1]]$ for $[[addr']]$, applies the sort permutation $[[\sigma_1]]$ to $[[addr']]$, and outputs the result (S130). At this time, within the array, $[[addr']]=([[0]], \ldots, [[0]], \ldots, [[B-1]], \ldots, [[B-1]])$, which is an array having, for each value of $i=0, \ldots, B-1$, a sequence of $Z+\alpha_i$ elements set to the same value. Here, $\alpha_i$ is the number of i contained in the original $[[addr]]$.

5. The conversion unit 140 receives the array $[[addr']]$ from the sort permutation generation application unit 130, converts the array $[[addr']]$ into an array with a sequence composed of first Z elements set to $[[i]]$ followed by $\alpha_i$ elements set to $[[B]]$, and outputs the converted array (S140). For example, the conversion unit 140 generates a new array $[[ctr]]=([[1]], \ldots, [[1]])$ having the same length as $[[addr]]$ and performs range prefix sum by using $[[addr]]$ as a key and $[[ctr]]$ as a value to obtain $[[ctr']]$ as a result. At this time, within the array, $[[ctr']]=([[1]], \ldots, [[Z+\alpha_1]], \ldots, [[1]], \ldots, [[Z+\alpha_{B-1}]])$ for $[[addr']]=([[0]], \ldots, [[0]], \ldots, [[B-1]], \ldots, [[B-1]])$.

6. The conversion unit 140 calculates an array $[[L_z]]=([[q_0]], \ldots, [[q_{N+B \times Z-1}]])$; $[[q_i]]=[[[addr'_i]] \leq_? Z]$ resulting from a comparison between each element of $[[ctr']]$ and Z. After that, $[[addr'_i]] \leftarrow [[B]]+[[q_i]] \times ([[added'_i]]-[[B]])$ is performed to obtain $[[addr']]=([[0]], \ldots, [[0]], [[B]], \ldots, [[B]], \ldots, [[B-1]], \ldots, [[B-1]], [[B]], [[B]])$, internally. This means that the array transitions from the original state where a sequence of $Z+\alpha_i$ elements set to $[[i]]$ is formed for each of the values $[[i]]$, to a state where a sequence composed of first Z elements set to $[[i]]$ followed by $\alpha_i$ elements set to $[[B]]$ is formed.

7. The sort permutation generation unit 150 receives the array $[[addr']]$ from the conversion unit 140 and again generates and outputs a sort permutation $[[\sigma_2]]$ for $[[addr']]$ (S150). Subsequently, the array $[[addr']]$ and the like may be deleted.

8. The table generation unit 160 generates B×Z pieces of dummy data $[[empty]]$ and imparts the generated B×Z pieces of dummy data $[[empty]]$ to the data sequence $[[\~A]]$, to obtain a data sequence having a length of N+B×Z. The table generation unit 160 sequentially applies permutations $[[\sigma_1]]$ and $[[\sigma_2]]$ to the data sequence imparted with B×Z pieces of dummy data $[[empty]]$ with respect to the data sequence $[[\~A]]$, to generate, as the secret hash table, B×Z data sequences in which the last N pieces of data are deleted (S160). Specifically, if address values are assigned so that an address value 0 is assigned to the first Z pieces of data in the data sequence, an address value 1 is assigned to the next Z pieces of data, and the like, it is possible to create a data structure in which Z pieces of data are stored in B address values.

In the present embodiment, if $[[k_i]]$ is O(log N) bits and B×Z=O(N), the number of pieces of data communicated between servers is O(N) pieces of data in the permutation application, and communication of $O(N \log^2 N)$ bits is required for the sorting, range prefix sum, and comparison of accompanying address values. In the procedure described above, an operation of a client is not required.

Effects

In the present embodiment, a hash table can be constructed while keeping the table structure and data concealed from a server. Regarding the overall communication cost including communication between servers, operations with respect to the data body are also reduced. Consequently, in the present embodiment, a hash table can be efficiently constructed when the size of the data body is large. As described in a second embodiment below, when a user refers to the table, the user-server communication cost is O(1).

Second Embodiment

In the description according to the present embodiment, a method of accessing the secret hash table constructed in the first embodiment will be described.

Figure 4:
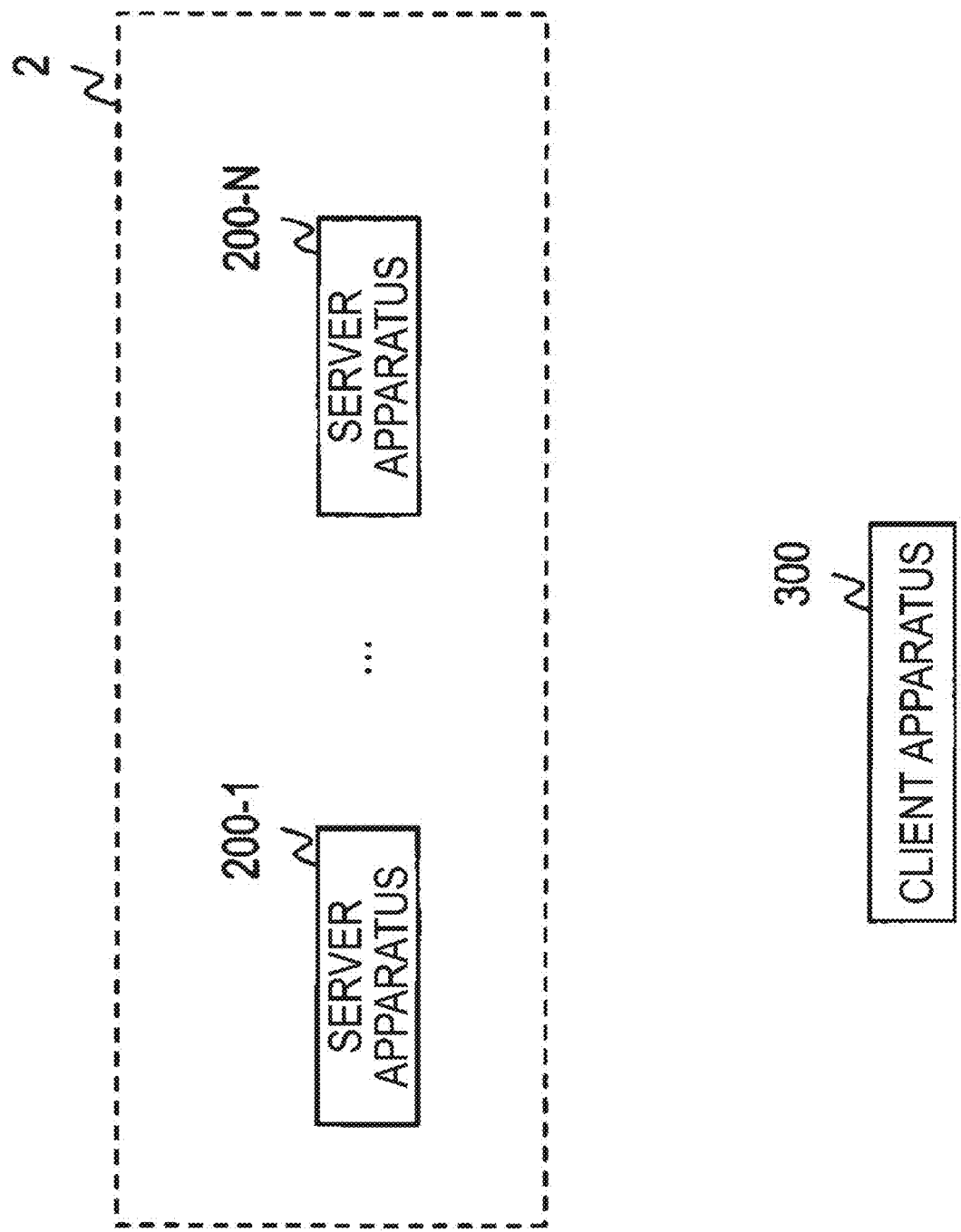
FIG. 4 is a diagram illustrating an exemplary configuration of a reference system according to a second embodiment.

FIG. 4 illustrates an exemplary configuration of a reference system according to the present embodiment. A reference system 2 includes N server apparatuses. At least M server apparatuses 200-*m* of the N server apparatuses 200-*n* refer to a secret hash table by a coordination protocol, based on secure computation. The reference system 2 may be implemented in the secret hash table construction system 1 or may be implemented in a system receiving the secret hash table and information necessary for referring to the secret hash table, from the secret hash table construction system.

Figure 5:
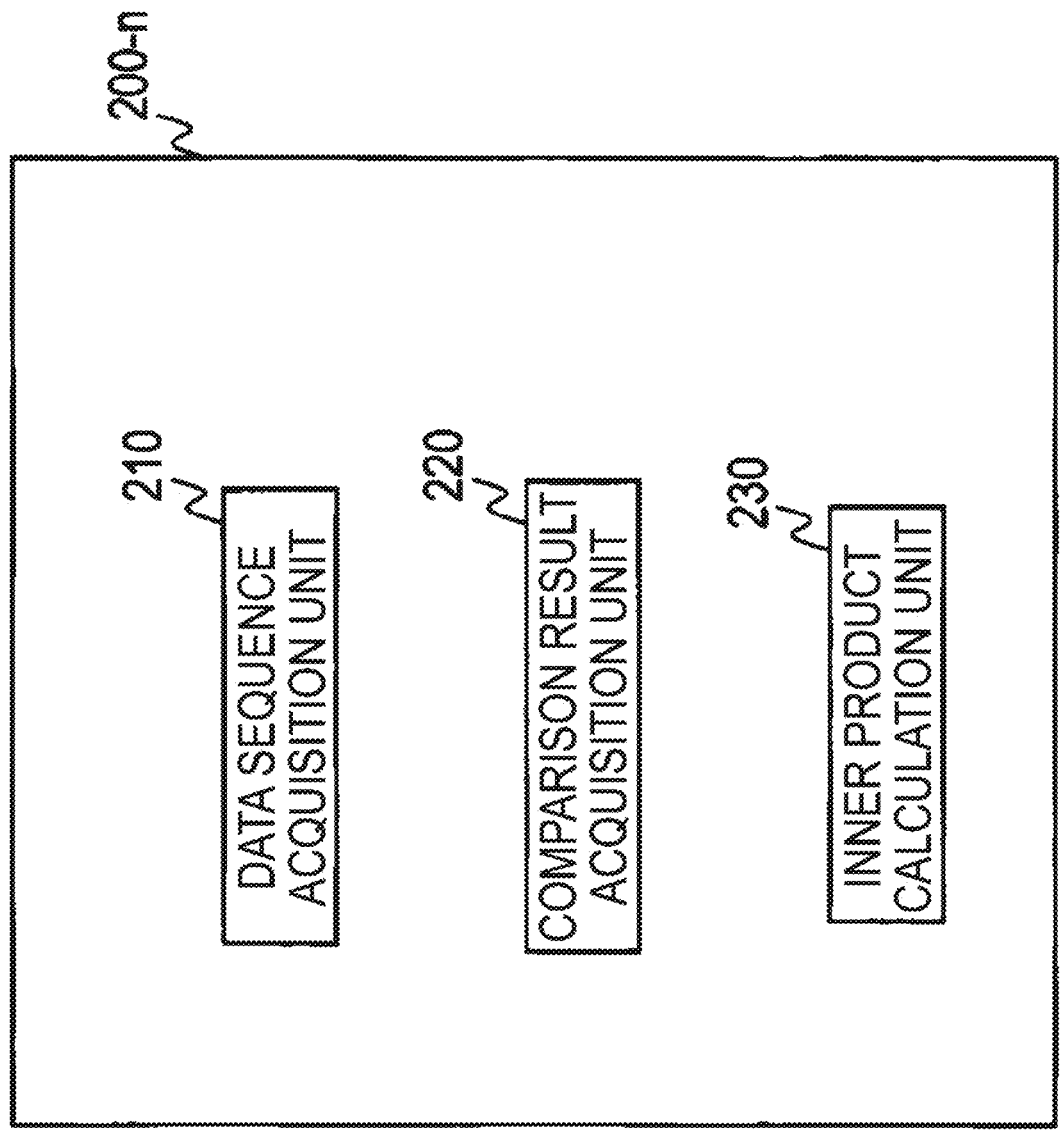
FIG. 5 is a functional block diagram of a server apparatus according to the second embodiment.
Figure 6:
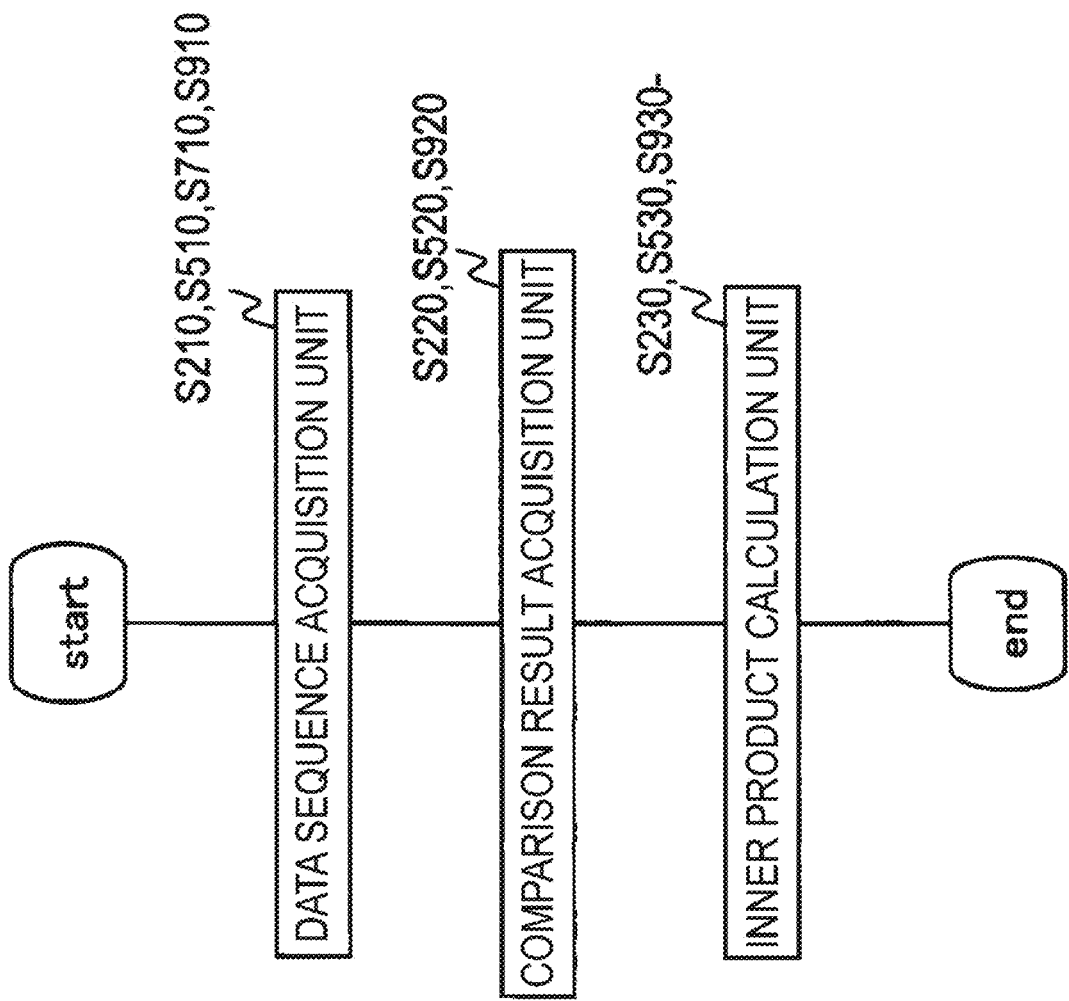
FIG. 6 is a diagram illustrating an example of a flowchart of processing of a secret hash table construction system according to second, fifth, seventh, and ninth embodiments.

FIG. 5 illustrates a functional block diagram of the server apparatus 200-*n* and FIG. 6 illustrates an example of a flowchart of processing of the reference system.

The server apparatus 200-*n* includes a data sequence acquisition unit 210, a comparison result acquisition unit 220, and an inner product calculation unit 230. Each unit of the at least M server apparatuses 200-*m* of the N server apparatuses 200-*n* performs each processing by a coordination protocol, based on secure computation. In this regard, in the following description, it is simply assumed that each unit performs the processing.

1. A user (a client apparatus 300) transmits a concealed key value [[k]] of the data to be accessed to the reference system 2. Thus, the concealed key value is transmitted to the server as a request from the user. However, the server can also generate a concealed key value, based on an agreement between servers.
2. The data sequence acquisition unit 210 of the server apparatus 200-*n* receives the concealed key value [[k]], uses a pseudo-random function to generate an address value [[t]]←PRF([[k]], [[s]]), and restores an address value t. Subsequently, the data sequence acquisition unit 210 acquires and outputs a data sequence [[A$^r$]]= ([[a$^r_0$]], . . . , [[a$^r_{Z-1}$]]) corresponding to the address value t in the secret hash table (S210).
3. The comparison result acquisition unit 220 of the server apparatus 200-*n* receives the data sequence [[A$^r$]] from the data sequence acquisition unit 210 and compares each piece of data with a key value to calculate and output an array [[E]]=([[e$_0$]], . . . , [[e$_{Z-1}$]]); [[e$_i$]]= [[[k$^r_i$]]=$_?$[[k]]] (S220).
4. The inner product calculation unit 230 receives the data sequence [[A$^r$]] from the data sequence acquisition unit 210, receives the array [[E]] from the comparison result acquisition unit 220, calculates an inner product [[a]] ←<[[A$^r$]], [[E]]> (S230), and transmits the inner product as a reply to the user or restores the inner product, based on an agreement between servers. Alternatively, the inner product calculation unit 230 may not restore the inner product, but may use the inner product for completely different secure computation processing.

In the present embodiment, the number of pieces of data communicated between the user and the server is O(1), the number of pieces of data communicated between servers is O(1), and communication related to the accompanying key value is O(Z log N) bits.

Effects

In the present embodiment, the user-server communication cost is only O(1). In related-art methods, communication of O(N log N) pieces of data is required between the user and the server.

Third Embodiment

Differences from the first embodiment will be mainly described.

In the first embodiment, there is a risk that when the number N of pieces of data is too large to be stored into the secret hash table, the data may be deleted. A table constructing method according to the present embodiment eliminates such a risk. The present embodiment is a simple extension of the first embodiment, and specifically, the following modifications are made.

In imparting the dummy data in procedure 8 (S160) of the first embodiment, the table generation unit 160 imparts a concealment bit [[0]] to each piece of data of the original data sequence [[~A]], and a concealment bit [[1]] to each piece of dummy data.

The table generation unit 160 imparts B×Z pieces of dummy data [[empty]] to the data sequence [[~A]], sequentially applies permutations [[σ$_i$]] and [[σ$_2$]] to the data sequences imparted with the concealment bit [[0]] or [[1]], and generates B×Z data sequences from which the last N pieces of data are deleted. Furthermore, after sorting the data sequences, the table generation unit 160 calculates a product (logical product) in which all of the above-mentioned concealment bits corresponding to the last N pieces of data to be deleted are used.

The table generation unit 160 restores the above-mentioned logical product and when the value of the logical product is 0, the table generation unit 160 reselects a secret key [[s]] to newly construct the table. When the value of the logical product is different from 0, the generated B×Z data sequences are used as the secret hash table (S360).

If the method described above is used, the logical product is 0 when real data is included in the data to be deleted, and thus, the real data can be detected. Even if this method is used, the efficiency is asymptotically equivalent to that of the first embodiment.

Fourth Embodiment

In the present embodiment, a method for reducing the probability of data deletion in the first embodiment or reducing the probability that procedures need to be redone in the third embodiment is described. The present embodiment is a simple extension of the first to third embodiments, and specifically, the following modifications are made.

The hash table constructed in the present embodiment is composed of two data structures having a size B×Z. The two tables have respective separate secret keys [[s$_1$]] and [[s$_2$]].

As in the first embodiment, the server uses the secret key [[s$_1$]] to construct one secret hash table. However, the table generation unit 160 does not delete the last N pieces of data in procedure 8 (S160), and uses the data sequence as a new data sequence [[B]].

The table generation unit 160 of the server apparatus 100-$n$ uses the secret key [[$s_2$]] to construct a second secret hash table for the data sequence [[B]] (S460). At this time, the table generation unit 160 performs the same procedure as those of the first to third embodiments.

The cost of the method described above is about twice as high as that of the first embodiment, but there is no change in the asymptotic evaluation. In the third embodiment, the cost is similar as in the fourth embodiment, when the procedure is redone once. Thus, the fourth embodiment is effective when parameters N, B, and Z are selected, for which the procedures in the first to third embodiments tend to be more frequently redone.

Fifth Embodiment

Differences from the second embodiment will be mainly described.

In the description according to the present embodiment, a method of accessing the secret hash table constructed in the fourth embodiment is described.

1. The user (the client apparatus 300) transmits, to the reference system 2, a concealed key value [[k]] of the data to be accessed and a dummy [[d]] different from all data keys. It is possible to generate this concealed key value and the dummy not only by a request from the user to the server, but also by the server, based on an agreement between servers.
2. The data sequence acquisition unit 210 of the server apparatus 200-$n$ receives the concealed key value [[k]], uses a pseudo-random function to generate an address value [[t]]←PRF([[k]], [[$s_1$]]), and restores the address value [[t]]. Subsequently, the data sequence acquisition unit 210 acquires and outputs a data sequence [[$A^t$]]=([[$^t_0$]], . . . , [[$a^t_{Z-1}$]]) corresponding to the address value t in the first secret hash table (S510).
3. The comparison result acquisition unit 220 of the server apparatus 200-$n$ receives the data sequence [[$A^t$]] from the data sequence acquisition unit 210 and compares each piece of data with a key value to calculate and output an array [[E]]=([[$e_0$]], . . . , [[$e_{Z-1}$]]); [[$e_i$]]= [[[$k^t_i$]]=$_?$[[k]]] (S520).
4. The inner product calculation unit 230 receives the data sequence [[$A^t$]] from the data sequence acquisition unit 210, receives the array [[E]] from the comparison result acquisition unit 220, calculates an inner product [[a]]←[[$A^t$]], [[E]]>, and calculates [[f]]∂$\Sigma^{Z-1}_{i=0}$[[$e_i$]], and outputs [[f]].
5. The data sequence acquisition unit 210 of the server apparatus 200-$n$ receives [[f]] from the inner product calculation unit 230, receives a dummy [[d]] from the user, calculates [[k']]←[[k]]+[[f]]×([[d]]−[[k]]), and generates and restores an address value [[t']]←PRF ([[k']], [[$s_2$]]). Subsequently, the data sequence acquisition unit 210 acquires and outputs a data sequence [[$B^{t'}$]]=([[$b^{t'}_0$]], . . . , [[$b^{t'}_{Z-1}$]]) corresponding to the address value t' in the second secret hash table.
6. The comparison result acquisition unit 220 of the server apparatus 200-$n$ receives the data sequence [[$B^{t'}$]] from the data sequence acquisition unit 210 and compares each piece of data with a key value to calculate and output [[E']]=([[$e'_0$]], . . . , [[$e'_{Z-1}$]]); [[$e'_i$]]=[[[$k^{t'}_i$]]=$_?$ [[k]]]. The inner product calculation unit 230 receives the data sequence [[$B^{t'}$]] from the data sequence acquisition unit 210, receives the array [[E']] from the comparison result acquisition unit 220, calculates an inner product [[b]]←<[[$B^{t'}$]], [[E']]> (S530), and outputs the inner product.
7. Finally, the server apparatus 200-$n$ calculates [[a]]+ [[b]] and transmits the result as a reply to the user or restores the result, based on an agreement between servers. Alternatively, the server apparatus 200-$n$ may not restore the result, but may use the result for completely different secure computation processing.

In the present embodiment, the number of pieces of data communicated between the user and the server is O(1), the number of pieces of data communicated between servers is O(1), and communication related to the accompanying key value is O(Z log N) bits.

Sixth Embodiment

Differences from the first embodiment will be mainly described.

In the description according to the present embodiment, a method of constructing a secret hash table is described in which the efficiency of the first, third, and fourth embodiments is improved.

A method for improving the efficiency, using the first embodiment as a basis, is described below. In order to improve the efficiency of the third and fourth embodiments, a similar extension as in the third and fourth embodiments is applied to the following method.

Figure 7:
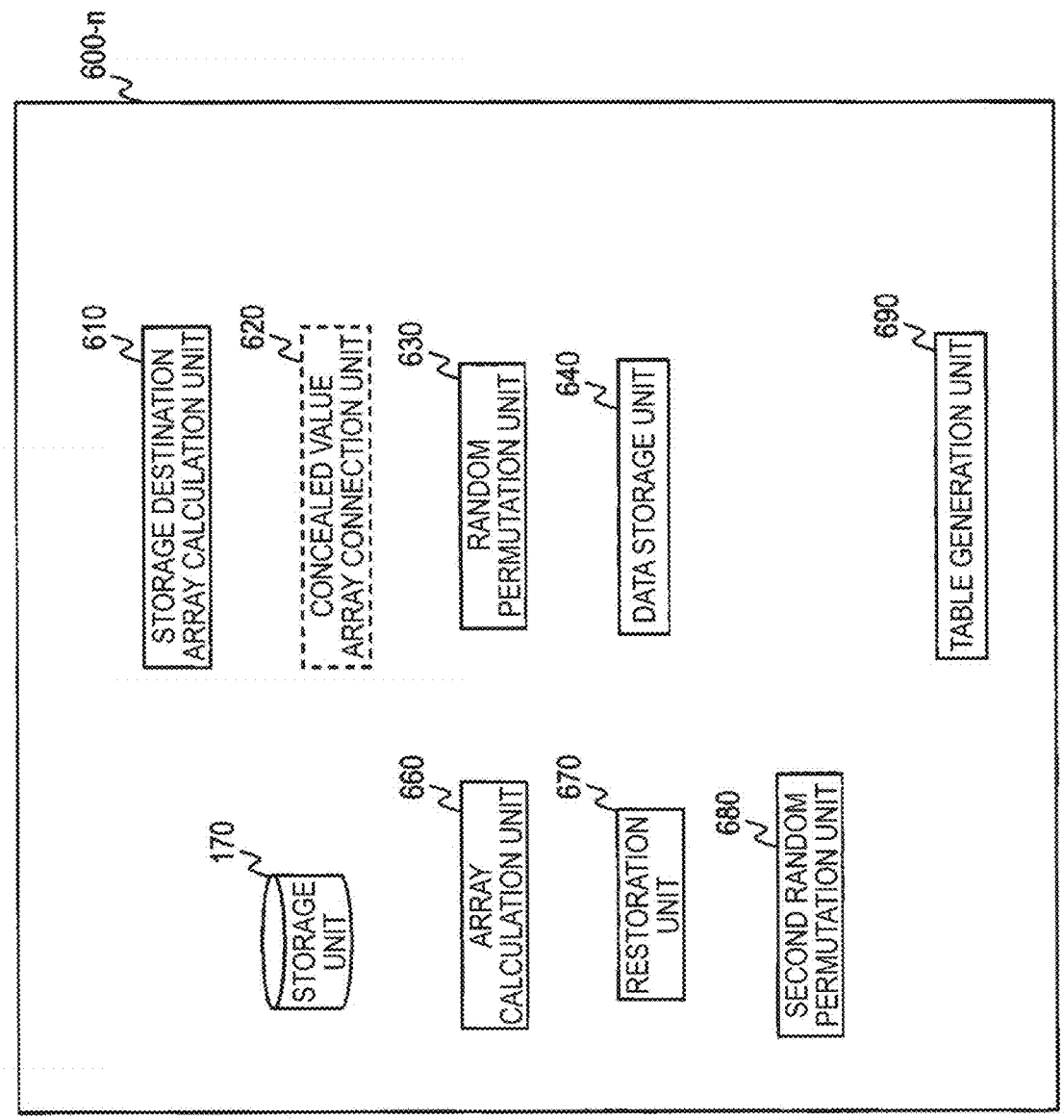
FIG. 7 is a functional block diagram of a server apparatus according to a sixth embodiment.
Figure 8:
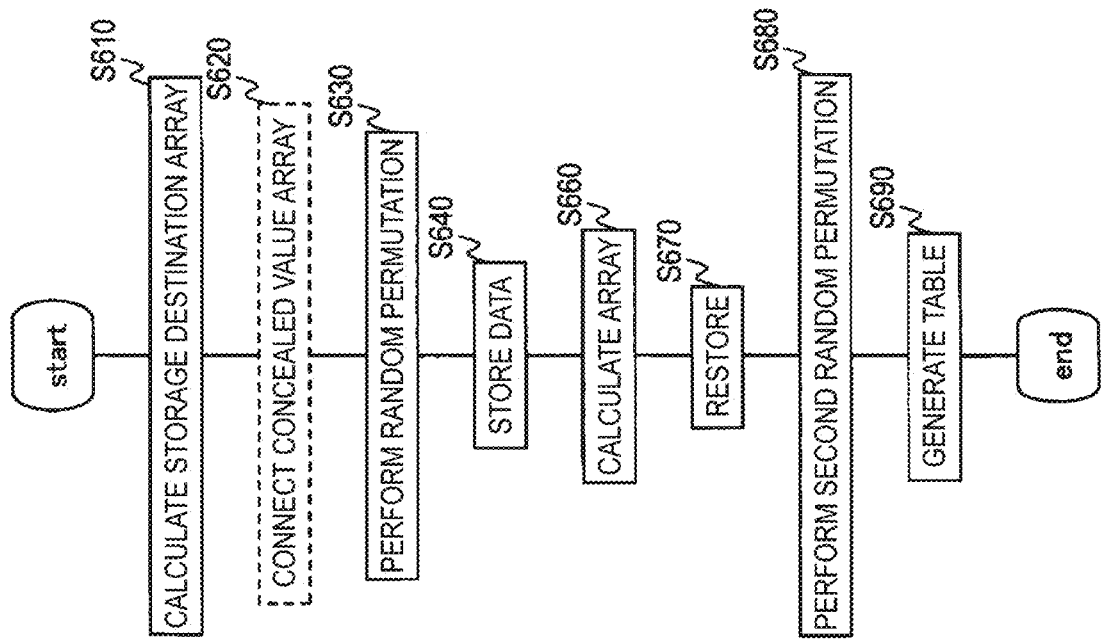
FIG. 8 is a diagram illustrating an example of a flowchart of processing of a secret hash table construction system according to the sixth embodiment.

FIG. 7 illustrates a functional block diagram of a server apparatus 600-$n$, and FIG. 8 illustrates an example of a flowchart of processing of a secret hash table construction system.

The server apparatus 600-$n$ includes a storage destination array calculation unit 610, a concealed value array connection unit 620, a random permutation unit 630, a data storage unit 640, an array calculation unit 660, a restoration unit 670, a second random permutation unit 680, a table generation unit 690, and the storage unit 170.

1. First, the storage destination array calculation unit 610 extracts the concealed data sequence [[A]] from the storage unit 170, and calculates and outputs an array [[addr]]=([[$addr_0$]], . . . , [[$addr_{N-1}$]]); [[$addr_i$]]←PRF ([[$k_i$]], [[s]]) indicating a storage destination of each piece of data of the data sequence [[A]] (S610). Furthermore, the concealed value array connection unit 620 indicated by a dashed line in FIG. 7 may generate a sequence [[A']] in which a plurality of pieces of dummy data are arranged in accordance with safety requirements, and combines the sequence [[A']] with the end of [[A]]. The number of pieces of dummy data is assumed to be B×Z−N, for example, but another number is also possible. In this case, the concealed value array connection unit 620 uniformly and randomly selects all storage destinations [[addr']]= ([[$addr_0$]], . . . , [[$addr_{|A'|}$]]) of the dummy data from {0, . . . , B−1} and combines the storage destinations with the end of [[addr]]. Additionally, the concealed value array connection unit 620 imparts a 1-bit concealed value [[d]] for distinguishing real data and dummy data, to each piece of data of the real data and the dummy data (S620 illustrated by a dashed line in FIG. 8).
2. The random permutation unit 630 extracts the concealed data sequence [[A]] (sequence including only real data) from the storage unit 170, or receives the concealed data sequence [[A]] (sequence in which real data and dummy data are combined) from the concealed value array connection unit 620, applies a random permutation to the data sequence [[A]] to obtain [[~A]] Apply([[π]], [[A]]), and outputs [[~A]]. Similarly, the random permutation unit 630 applies the same random permutation to an array [[addr]] of a storage destination corresponding to [[A]] to obtain [[~addr]]←Apply([[π]], [[addr]]), and outputs [[~addr]] (S630).

3. The data storage unit 640 prepares B empty arrays $Bin_j$; $j \in \{0, \ldots, B-1\}$. Each $Bin_j$ can store a maximum of $Z+\alpha$ pieces of data. Here, $\alpha$ is an integer that can be freely determined in accordance with safety requirements. Subsequently, if $Z+\alpha$ or more pieces of data are stored in any $Bin_j$, the protocol is interrupted, the secret key [[s]] is reselected, and then, the processing is redone from procedure 1. Conversely, even if the number of pieces of data stored in any $Bin_j$ is extremely small (for example, 0 pieces of data), the processing may be redone as necessary.

4. The data storage unit 640 receives [[~addr]] from the random permutation unit 630, restores all values of [[~addr]], and stores each element [[~$A_i$]] of the data sequence [[~A]] in an ~$addr_i$-th array $Bin_{\sim addr\_i}$. Note that ~addr_j in the subscript refers to ~$addr_i$.

5. After all the data is stored in any of the arrays $Bin_j$, if there is an array having less than Z+a pieces of stored data, the data storage unit 640 generates the dummy data so that every $Bin_j$ includes $Z+\alpha$ pieces of data (S640). Furthermore, if the dummy data is combined in procedure 1, each $Bin_j$ is sorted so that the real data is arranged first and followed by the dummy data. At this time, the 1-bit concealed value [[d]] is used as the key for sorting, and thus, the permutation generation cost is $O((Z+\alpha) \log (Z+\alpha))$, and the permutation application cost is $O(Z+\alpha)$. There are B arrays in total, and thus, the permutation generation cost is $O(B (Z+\alpha) \log (Z+\alpha))$ and the permutation application cost is $O(B (Z+\alpha))$ for the entire operation.

6. The array calculation unit 660 newly prepares a (pseudo) random permutation function PRP and a secret key [[$s_p$]] of the (pseudo) random permutation function PRP. This PRP is a special example of a pseudo-random function and can be created using the known pseudo-random function mentioned above. Here, it is assumed that a pseudo-random permutation such as PRP: $\{[[0]], \ldots, [[B-1]]\} \times [[K]] \rightarrow \{[[0]], \ldots [[B-1]]\}$ is used. That is, in the pseudo-random permutation, a secret key and a concealed value from 0 to B−1 are input, and a random concealed value $[[t]] \in \{[[0]], \ldots, [[B-1]]\}$ is output. At this time, the array calculation unit 660 creates a new concealed value array ([[0]], [[1]], ..., [[B−1]]) and calculates and outputs a concealed value array (PRP([[0]], [[$s_p$]]), PRP([[1]], [[$s_p$]]), ..., PRP([[B−1]], [[$s_p$]])) (S660).

7. The restoration unit 670 receives the array (PRP([[0]], [[$s_p$]]), PRP([[1]], [[$s_p$]]), ..., PRP([[B−1]], [[sp]])) from the array calculation unit 660, newly creates a random permutation [[π']], applies the newly created random permutation [[π']] to the array (PRP([[0]], [[$s_p$]]), ..., PRP([[B−1]], [[$s_p$]])) created as described above, and then restores and outputs a result of the application (S670). At this time, the restored values form an array in which the values 0, ..., B−1 are randomly arranged. At the same time, the second random permutation unit 680 receives the array $Bin_j$ from the data storage unit 640, applies [[π']] to the array ($Bin_0, \ldots, Bin_{B-1}$), and outputs the resulting array ($Bin'_0, \ldots, Bin'_{B-1}$) (S680). Here, a permutation is used for an array having B elements, and thus, the permutation generation cost is O(B log B), and the application cost is O(B log B) in the application of the random permutation [[π']] to the array (PRP([[0]], [[$s_p$]]), ..., PRP([[B−1]], [[$s_p$]])) and O(BZ) in the application of [[π']] to the array ($Bin_0, \ldots, Bin_{B-1}$).

8. Finally, the table generation unit 690 receives the array ($Bin'_0, \ldots, Bin'_{B-1}$) from the second random permutation unit 680 and removes the last a pieces of data from each $Bin'_j$ (corresponding to procedure 8 of the first embodiment) to obtain a table composed of B×Z pieces of data as a whole, as the secret hash table (S690).

In the present embodiment, if the parameters B=O(N/log N), Z=O(log N), and $\alpha$=O(Z) are selected, for example, the communication between servers generated by the operation described above is communication using O(N) pieces of data in the permutation application and O(N log N)-bit communication in the sorting and permutation application to the accompanying key value and the like. Thus, communication of only about 1/log N times the communication of the first embodiment is required. Of course, client-server communication is still not required.

Seventh Embodiment

Differences from the second embodiment will be mainly described.

A method of accessing the secret hash table constructed in the sixth embodiment differs from that of the second embodiment only in the following points. When the extension of the fourth embodiment is applied to the sixth embodiment, similar modifications as described below are applied in the fifth embodiment.

In procedure 2 (S210) of the second embodiment, the data sequence acquisition unit 210 of the server apparatus 200-n generates the address value [[t]]←PRP(PRF([[k]], [[s]]), [[$s_p$]]).

More specifically, the data sequence acquisition unit 210 of the server apparatus 200-n receives the concealed key value [[k]], uses the pseudo-random functions PRF and PRP and the secret keys [[s]] and [[[$s_p$]] to generate the address value [[t]]←PRP(PRF([[k]], [[s]]), [[sp]]), and restores the address value [[t]]. Subsequently, the data sequence acquisition unit 210 acquires and outputs the data sequence $[[A']]=([[a'_0]], \ldots, [[a'_{Z-1}]])$ corresponding to the address value tin the secret hash table (S710 in FIG. 6).

Eighth Embodiment

Differences from the fourth embodiment will be mainly described.

Figure 9:
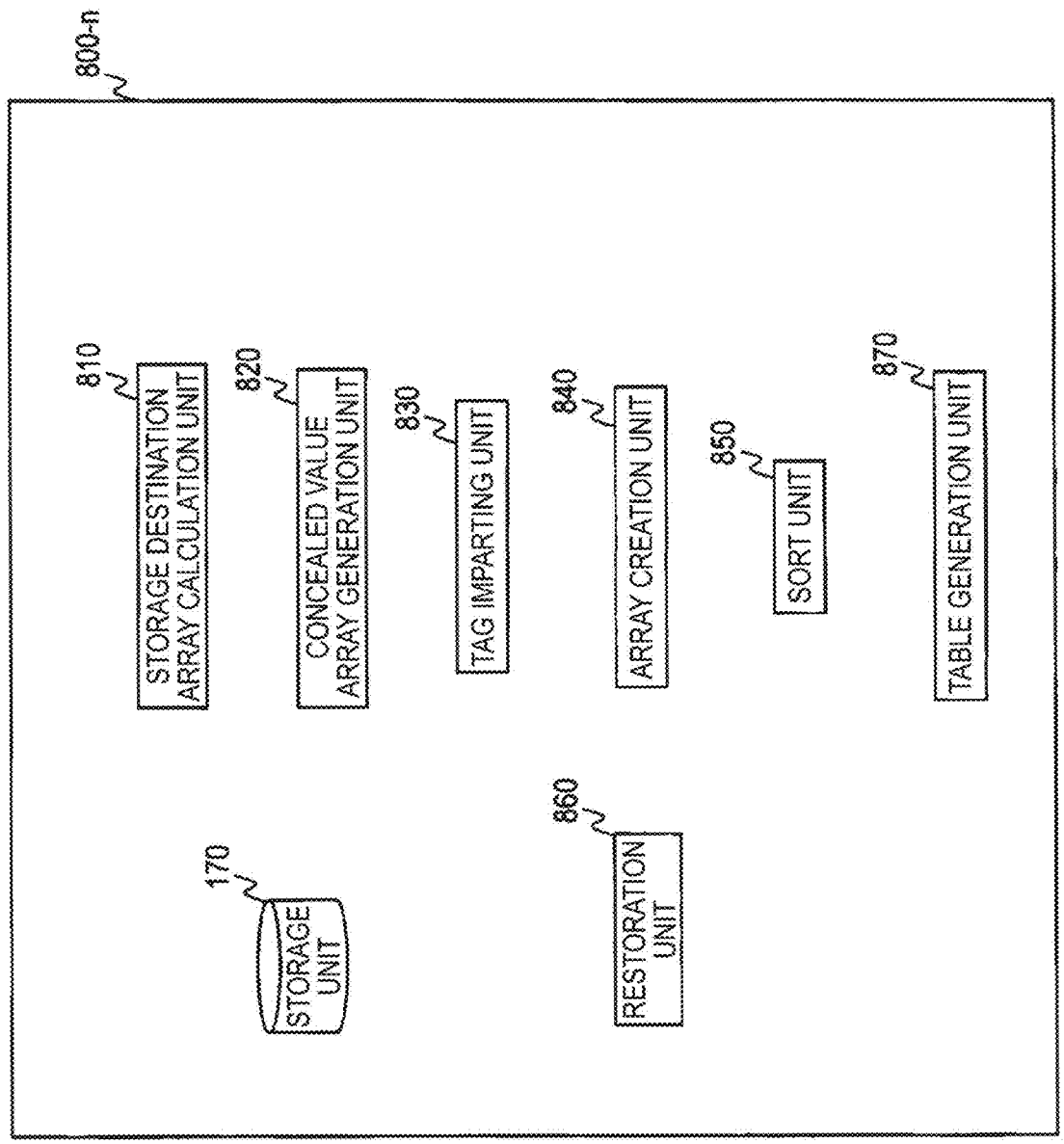
FIG. 9 is a functional block diagram of a server apparatus according to the eighth embodiment.
Figure 10:
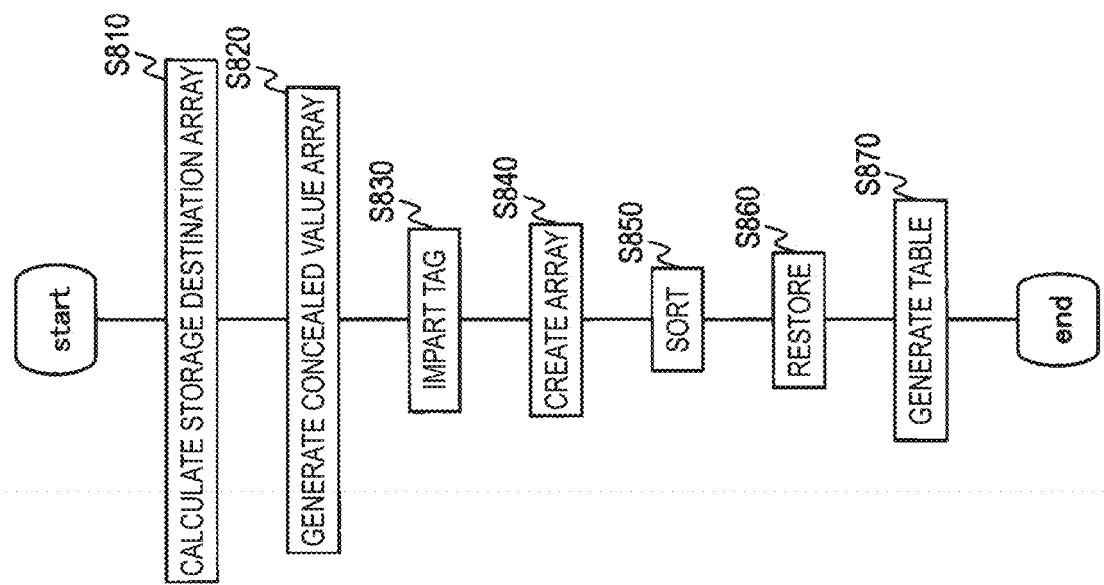
FIG. 10 is a diagram illustrating an example of a flowchart of processing of the secret hash table construction system according to the eighth embodiment.

FIG. 9 illustrates a functional block diagram of a server apparatus 800-n, and FIG. 10 illustrates an example of a flowchart of processing of a secret hash table construction system.

The server apparatus 800-n includes a storage destination array calculation unit 810, a concealed value array generation unit 820, a tag imparting unit 830, an array creation unit 840, a sort unit 850, a restoration unit 860, and a table generation unit 870.

Although the communication cost is higher in the present embodiment than in the fourth embodiment, the present embodiment is a method that achieves both of a smaller table size and lower deletion probability of real data. The hash table constructed in the present embodiment is a data array having a size of B×Z, which is half the size of the hash table in the fourth embodiment. In the present embodiment, the server constructs a secret hash table as described below.

1. First, the server apparatus 800-$n$ extracts the concealed data sequence [[A]] from the storage unit 170, applies a random permutation to [[A]] to obtain [[~A]]←Apply ([[π]], [[A]]), and outputs [[~A]]. However, it is assumed that this operation does not need to be performed, depending on a state of the [[A]] to be input and the safety to be satisfied.
2. The storage destination array calculation unit 810 extracts the concealed data sequence [[A]] from the storage unit 170, and calculates and outputs "two" arrays [[addr$^0$]]=[[addr$^0_0$]], . . . , [[addr$^0_{N-1}$]]); [[addr$^0_i$]]←PRF([[k$_i$]], [[s$^0$]]) and [[addr$^1$]]= [[addr$^1_0$]], . . . , [[addr$^1_{N-1}$]]); [[addr$^1_i$]]←PRF([[k$_i$]], [[s$^1$]]) indicating a storage destination of each piece of data for [[A]] (S810). That is, the storage destination array calculation unit 810 uses a key [[k$_i$]] of each piece of data as input of a pseudo-random function and a secret key [[s$^0$]] as the secret key of the pseudo-random function to determine a pseudo-random function value [[addr$^0_i$]] and an array [[addr$^0$]] indicating the storage destination of each piece of data, for the concealed data sequence [[A]]. Furthermore, the storage destination array calculation unit 810 uses the key [[k$_i$]] of each piece of data as input of the pseudo-random function and uses the secret key [[s$^1$]] as the secret key of the pseudo-random function to determine a pseudo-random function value [[addr$^1_i$]] and an array [[addr$^1$]] indicating a storage destination of each piece of data, for the concealed data sequence [[A]]. Subsequently, a sort permutation is generated by using the values of these two types of arrays as key values and used to construct a hash table.
3. The concealed value array generation unit 820 generates and outputs concealed value arrays [[addr$^0_{dummy}$]]= ([[0]], . . . , [[0]], [[1]], [[1]], . . . , [[B-1]], . . . , [[B-1]]) and [[addr$^1_{dummy}$]]=([[0]], . . . , [[0]], [[1]], . . . , [[1]], . . . , [[B-1]], . . . , [[B-1]]) (S820). Each of these arrays is a concealed value of an array having, for each value of i=0, . . . , B-1, a sequence of Z elements set to the same value.
4. An array in which B×Z pieces of dummy data are connected to [[A]] is referred to as [[A']]. The tag imparting unit 830 imparts tags [[1]], . . . , [[N+BZ]] to [[A']] in order from a beginning of [[A']], and outputs a result obtained by imparting the tags (S830). At this point, the tags [[1]], . . . , [[N]] correspond to real data originally belonging to [[A]], and the rest of the tags correspond to the dummy data.
5. The array creation unit 840 receives the values created as described above, and newly creates an array [[T]]= ([[t$_1$]], . . . , [[t$_{N+BZ}$]]) from these values (S840). Here, [[t$_i$]]=([[i]], [[addr$^0_i$]], [[addr$^1_i$]], [[d]]), where [[i]] is a tag created in procedure 4 (S830), [[addr$^0_i$]] and [[addr$^1_i$]] are elements of the array created in procedure 2 (S810) (however, in the case of dummy data, they are elements of [[addr$^0_{dumm}$]], [[addr$^1_{dummy}$]] created in procedure 3 (S820)), and [[d]] is a 1-bit concealed value indicating whether or not data is dummy data.
6. The sort unit 850 receives the array [[T]], and performs, on the array [[T]], the following operations Z times to output Z arrays [[L$^0_j$]] having a length B described below and a remaining array [[T]].

First, the sort unit 850 newly generates a secret random permutation and applies the new secret random permutation to [[T]].

Next, the sort unit 850 generates a sort permutation in which [[addr$^0_i$]] is a key value and applies the generated sort permutation to [[T]].

The sort unit 850 creates, for the sorted array [[T]]=((*, [[1]], *, *), . . . (*, [[1]], *, *), (*, [[2]], *, *), . . . (*, [[2]], *, *), . . . (*, [[B]], *, *), . . . (*, [[B]], *, *)), a secret array [[M]]=([[1]], [[0]], . . . , [[0]], . . . , [[1]], [[0]], . . . , [[0]]) in which data located at the beginning for each address value is marked. Specifically, a first item is obviously set to [[1]], and for second and following items, values obtained by performing equality determination between an address value of an item and an address value of an adjacent item on the left and performing bit inversion are sequentially stored.

The sort unit 850 creates a sort permutation with respect to [[M]] created as described above and applies the created sort permutation to [[T]]. At this time, B pieces of data that are marked in [[M]] are arranged at the end of [[T]]. That is, the B pieces of data composed of the first data for each address value are collected at the end of [[T]].

The B pieces of data at the end of [[T]] are separated from [[T]] and the resulting array is retained as an array [[L$^0_j$]] (j=1, . . . , Z being an iterator of this iterative processing). That is, the array [[L$^0_j$]] stores the B pieces of data composed of the first data for each address value. Furthermore, an array having a length shortened by B in the separation is referred to as [[T"]].

Next, sorting using [[addr$^1_i$]] as a key value is applied to [[T"]]. Subsequently, similarly as described above, locations of the beginning are marked and sorting is applied to extract a data array [[L$^1_i$]] composed of the last B pieces of data.

The sort unit 850 compares each element of the arrays [[L$^0_j$]] and [[L$^1_i$]] in order from the beginning and when dummy data (d=1) is present in B$^0_j$, exchanges the elements. That is, dummy data of the array [[L$^0_j$]] is moved to the array [[L$^1_i$]], and data at the corresponding position of the array [[L$^1_i$]] is moved to the array [[L$^0_j$]]. This exchange can be realized by using a multiplication, such as in [[L$^0_j$]]←[[L$^0_j$]]+[[d]])[[L$^1_i$]]−[[L$^0_j$]]), [[L$^1_i$]]←[[L$^1_i$]]+[[d]] ([[L$^0_j$]]−[[L$^1_i$]]).

Subsequently, [[L$^1_i$]] is again connected to the original [[T"]], the connected array is set as a new [[T]], and the processing is returned to the initial processing. If the procedure described above is repeated, Z arrays [[L$^0_j$]] having the length B and a remaining array [[T]] are generated.

7. Finally, the restoration unit 860 receives the Z arrays [[L$^0_j$]] having the length B and the remaining array [[T]], arranges Z arrays [[L$^0_j$]] having the length B, and deletes the remaining array [[T]], to obtain an array having a size of B×Z. Subsequently, the restoration unit 860 calculates, restores, and outputs a secret pseudo-random permutation for the tags of each array.
8. The restoration unit 860 receives an array [[A']] of the main body created earlier, and similarly calculates a secret pseudo-random permutation for the tags of the array [[A']]. Subsequently, the random permutation is applied to [[A']] and then, the tags are restored and output (S860). The table generation unit 870 only arranges, in a hash table, elements for which the tags of the array [[A']] of the main body and tags of a table corresponding to the array obtained by arranging Z arrays $[[L^0_j]]$ having the length B coincide, and removes the remaining elements, to generate a secret hash table (S870).

In the present embodiment, if $[[k_i]]$ is O(log N) bits and B×Z=O(N), the number of pieces of data communicated between servers is O(N) in the permutation application, or communication of O(Z×N log$^2$ N) bits is required for the sorting, range prefix sum, and comparison of accompanying address values. In the procedure described above, an operation of a client is not required.

Ninth Embodiment

Differences from the second embodiment will be mainly described.

The present embodiment is a method of accessing the hash table constructed in the eighth embodiment. The basic processing is the same as in the second embodiment, except for the following points.

In procedure 2 (S210), the data sequence acquisition unit 210 of the server apparatus 200-n receives the concealed key value [[k]] and generates and restores the "two" address values $[[t^0]] \leftarrow \text{PRF}([[k]], [[s^0]])$ and $[[t^1]] \leftarrow \text{PRF}([[k]], [[s^1]])$. Subsequently, the data sequence acquisition unit 210 acquires and outputs two data sequences $[[A^{t\_0}]] = ([[a^{t\_0}_0]], \ldots, [[a^{t\_0}_{Z-1}]])$ and $[[A^{t\_1}]] = ([[a^{t\_1}_0]], \ldots, [[a^{t\_1}_{Z-1}]])$ corresponding to the address values $t^0$ and $t^1$ in the secret hash table (S910 in FIG. 6). Note that the superscripts t_0 and t_1 refer to $t^0$ and $t^1$, respectively.

3. The comparison result acquisition unit 220 of the server apparatus 200-n receives the data sequences $[[A^{t\_0}]]$ and $[[A^{t\_1}]]$ from the data sequence acquisition unit 210, compares a key value with each piece of data of an array data sequence $[[A^{t\_0}]]||[[A^{t\_1}]]$ obtained by combining the data sequences $[[A^{t\_0}]]$ and $[[A^{t\_1}]]$, and calculates and outputs an array $[[E]]=([[e_0]], \ldots, [[e_{2z-1}]]); [[e_i]]=[[[k'_i]]=_?[[k]]]$ (S920 in FIG. 6).

4. The inner product calculation unit 230 receives the data sequences $[[A^{t\_0}]]$ and $[[A^{t\_1}]]$ from the data sequence acquisition unit 210, receives the array [[E]] from the comparison result acquisition unit 220, calculates an inner product $[[a]] \leftarrow <[[A^{t\_0}]]||[[A^{t\_1}]], [[E]]>$ (S930 in FIG. 6), and transmits the inner product as a reply to the user or restores the inner product, based on an agreement between servers. Alternatively, the inner product calculation unit 230 may not restore the inner product, but may use the inner product for completely different secure computation processing.

OTHER MODIFICATIONS

The present invention is not limited to the above embodiments and modifications. For example, the various processing operations described above may be executed not only in chronological order as described but also in parallel or on an individual basis as necessary or depending on the processing capabilities of the apparatuses that execute the processing. In addition, appropriate changes can be made without departing from the spirit of the present invention.

Program and Recording Medium

Figure 11:
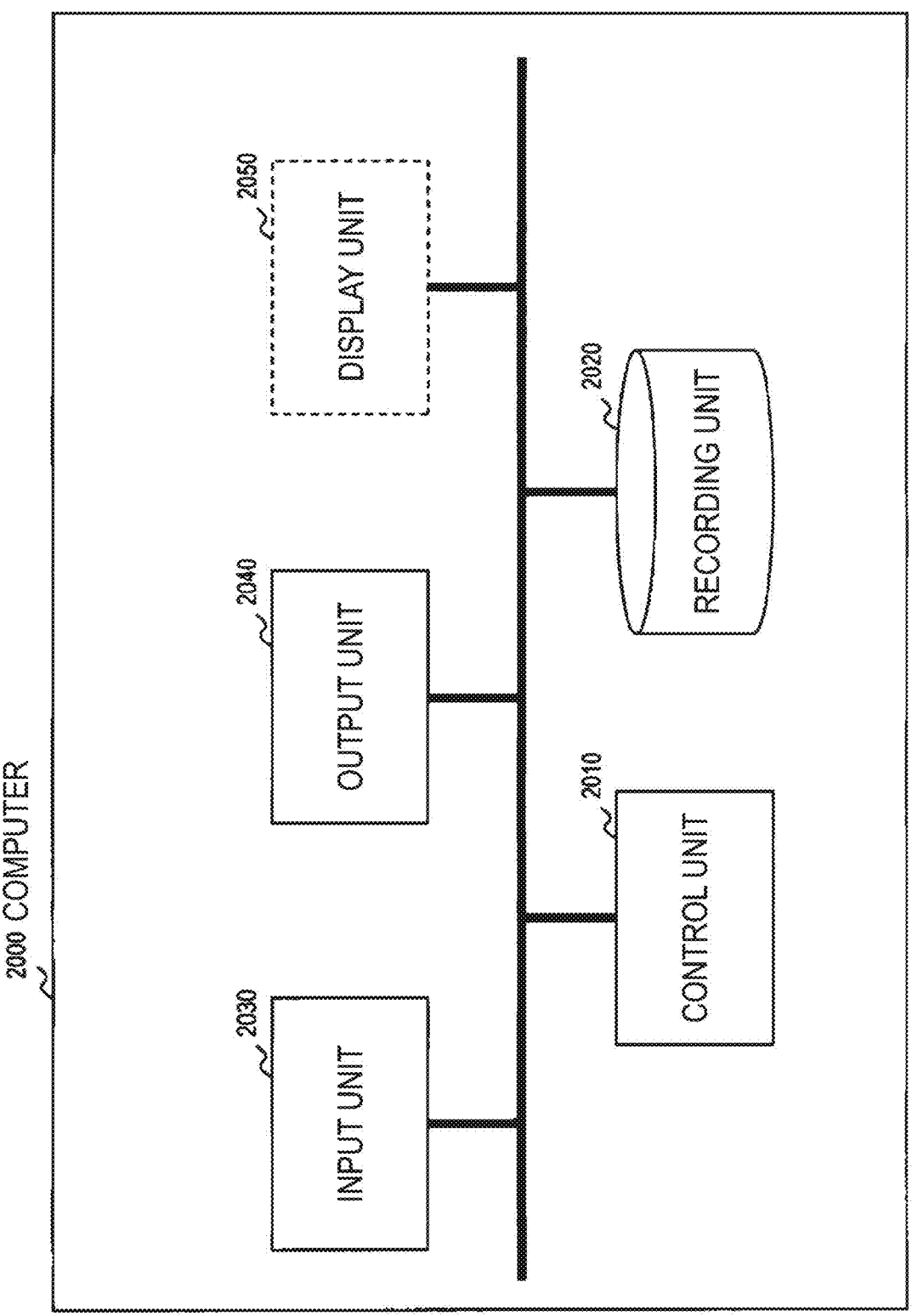
FIG. 11 is a diagram illustrating an exemplary configuration of a computer for implementing the present method.

The above-described various types of processing can be implemented by reading a program for executing each step of the above-mentioned method in a recording unit 2020 of a computer illustrated in FIG. 11, and causing a control unit 2010, an input unit 2030, an output unit 2040, and the like to execute the program. However, in the present invention, it is necessary that a plurality of server apparatuses construct the secret hash table by a coordination protocol using secure computation, and thus, a plurality of the computer illustrated in FIG. 11 need to be prepared.

The program in which the processing details are described can be recorded on a computer-readable recording medium. The computer-readable recording medium, for example, may be any type of medium such as a magnetic recording device, an optical disc, a magneto-optical recording medium, or a semiconductor memory.

In addition, the program is distributed, for example, by selling, transferring, or lending a portable recording medium such as a DVD or a CD-ROM with the program recorded on it. Further, the program may be stored in a storage device of a server computer and transmitted from the server computer to another computer via a network, so that the program is distributed.

For example, a computer executing the program first temporarily stores the program recorded on the portable recording medium or the program transmitted from the server computer in its own storage device. When the computer executes the processing, the computer reads the program stored in the recording medium of the computer and executes processing according to the read program. Further, as another execution mode of this program, the computer may directly read the program from the portable recording medium and execute processing in accordance with the program, or, further, may sequentially execute the processing in accordance with the received program each time the program is transferred from the server computer to the computer. In addition, another configuration may be employed to execute the processing through a so-called application service provider (ASP) service in which processing functions are implemented just by issuing an instruction to execute the program and obtaining results without transmitting the program from the server computer to the computer. Further, the program in this mode is assumed to include information which is provided for processing of a computer and is equivalent to a program (data or the like that has characteristics of regulating processing of the computer rather than being a direct instruction to the computer).

In addition, although the device is configured by executing a predetermined program on a computer in this mode, at least a part of the processing details may be implemented by hardware.

The invention claimed is:

1. A secret hash table construction system including a plurality of servers and constructing a secret hash table by a coordination protocol of the plurality of servers by using secure computation, wherein
   the secret hash table has a data structure configured to have B address values and storing a maximum of Z pieces of data for each of the B address values, and
   each of the plurality of servers comprises processing circuitry configured to implement:
      a storage destination array calculation unit configured to determine, for a concealed data sequence ((A)), a pseudo-random function value $((addr_i))$ by using a key $((k_i))$ of each piece of data of the concealed data sequence ((A)) as input of a pseudo-random function and a secret key ((s)) as a secret key of the pseudo-random function, to determine an array ((addr)) indicating a storage destination of each piece of the data;
      a concealed value array connection unit configured to generate an array $((addr_{dummy}))$ of concealed values and connect the generated array (($\text{addr}_{dummy}$)) to the array ((addr)) to determine an array (($\text{addr}'$))← ((addr))∥(($\text{addr}_{dummy}$));

a sort permutation generation application unit configured to generate a sort permutation (($\sigma_1$)) for the array (($\text{addr}'$)) by using values included in the array (($\text{addr}'$)) as keys and apply the sort permutation (($\sigma_1$)) to the array (($\text{addr}'$));

a conversion unit configured to convert the array (($\text{addr}'$)) into an array with a sequence composed of first Z elements set to ((i)) followed by $\alpha_i$ elements set to ((B)), $\alpha_i$ being the number of i included in the array (($\text{addr}'$));

a sort permutation generation unit configured to generate a sort permutation (($\sigma_2$)) for the converted array (($\text{addr}'$)) by using values included in the converted array (($\text{addr}'$)) as keys; and a table generation unit configured to generate dummy data ((empty)) for a concealed data sequence ((~A)) corresponding to the concealed data sequence ((A)), impart the generated dummy data ((empty)) to the concealed data sequence ((~A)), apply the sort permutations (($\sigma_1$)) and (($\sigma_2$)) to the data array imparted with the dummy data, and generate, as a secret hash table, a data sequence obtained by deleting the last N pieces of data from the sorted data array.

2. A reference system for referring to a secret hash table constructed by the secret hash table construction system according to claim 1, the reference system including a plurality of servers and referring to the secret hash table by a coordination protocol of the plurality of servers by using secure computation, wherein each of the plurality of servers comprises processing circuitry configured to implement:

a data sequence acquisition unit configured to use a concealed key value ((k)) of data to be referred to as input of a pseudo-random function PRF and use the secret key ((s)) to generate an address value ((t)) ←PRF(((k)), ((s))) corresponding to the concealed key value ((k)), restore an address value t from the address value ((t)), and acquire a data sequence (($A_t$)) corresponding to the address value;

a comparison result acquisition unit configured to compare key values included in the data sequence (($A_t$)) and the concealed key value ((k)) and calculate an array ((E)) composed of the results of the comparison; and an inner product calculation unit configured to calculate an inner product of the data sequence (($A_t$)) and the array ((E)).

3. The secret hash table construction system according to claim 1, wherein the secret hash table construction system constructs two secret hash tables having a data structure configured to have B address values and store a maximum of Z pieces of data for each of the B address values, and the table generation unit generates dummy data ((empty)) for the concealed data sequence ((~A)) corresponding to the concealed data sequence ((A)), imparts the generated dummy data ((empty)) to the concealed data sequence ((~A)), applies the sort permutations (($\sigma_1$)) and (($\sigma_2$)) to the data array imparted with the dummy data, generates, as a first secret hash table, a data sequence obtained by deleting the last N pieces of data from the sorted data array, and controls each of the units to construct a second secret hash table for a data sequence ((B)) composed of the last N pieces of data of the sorted data array, by using a second secret key (($s_2$)) instead of the secret key ((s)).

4. A secret hash table construction system including a plurality of servers and constructing a secret hash table by a coordination protocol of the plurality of servers by using secure computation, wherein the secret hash table has a data structure configured to have B address values and store a maximum of Z pieces of data for each of the B address values, and each of the plurality of servers comprises processing circuitry configured to implement:

a storage destination array calculation unit configured to determine, for a concealed data sequence ((A)), a pseudo-random function value (($\text{addr}^0_i$)) by using a key (($k_i$)) of each piece of data of the concealed data sequence ((A)) as input of a pseudo-random function and a secret key (($s^0$)) as a secret key of the pseudo-random function, to determine an array (($\text{addr}^0$)) indicating a storage destination of each piece of the data, and further configured to determine, for the concealed data sequence ((A)), a pseudo-random function value (($\text{addr}^1_i$)) by using the key (($k_i$)) of each piece of the data of the concealed data sequence ((A)) as input of the pseudo-random function and a secret key (($s^1$)) as a secret key of the pseudo-random function, to determine an array (($\text{addr}^1$)) indicating a storage destination of each piece of the data;

a concealed value array generation unit configured to generate arrays (($\text{addr}^0_{dummy}$)) and (($\text{addr}^1_{dummy}$)) of concealed values;

a tag imparting unit configured to impart tags ((1)), . . . , ((N+BZ)) to an array ((A')) obtained by connecting B×Z pieces of dummy data to the concealed data sequence ((A));

an array creation unit configured to create an array ((T))=((($t_1$)), . . . , (($t_{N+BZ}$))), where (($t_i$))=(((i)), (($\text{addr}^0_i$)), (($\text{addr}^1_i$)), ((d))), (i) is each of the tags, (($\text{addr}^0_i$)) and (($\text{addr}^1_i$)) are i-th elements of the arrays (($\text{addr}^0$)) and (($\text{addr}^1$)), respectively, and ((d)) is a concealed value indicating whether data is dummy data;

a sort unit configured to repeat the following processing (i) to (ix) Z times,
  (i) newly generating a secret random permutation for the array ((T)) and applying the new secret random permutation to the array ((T)),
  (ii) generating a sort permutation using an element (($\text{addr}^0_i$)) of the array (($\text{addr}^0$)) as a key value and applying the generated sort permutation to the array ((T)),
  (iii) creating, for a sorted array ((T')), a secret array ((M)) obtained by marking data located at the beginning for each address value,
  (iv) creating a sort permutation for the array ((M)) and applying the created sort permutation to ((T')),
  (v) separating the last B pieces of data from ((T')), retaining the B pieces of data as an array (($L^0_j$)), and retaining the array shortened by B as ((T'')),
  (vi) sorting ((T'')) by using (($\text{addr}^1_i$)) as a key value, creating, for the sorted array, a secret array obtained by marking the data located at the beginning for each address value, creating a sort permutation for the created array, and applying the created sort permutation to ((T'')), (vii) separating the last B pieces of data from $((T''))$ and retaining the B pieces of data as an array $((L^1_j))$, (viii) comparing respective elements of the arrays $((L^0_j))$ and $(L^1_j))$ in order from the beginning and exchanging elements when dummy data is present in $B^0_j$, and (ix) connecting $((L^1_j))$ to the array $((T''))$, setting the connected array as a new array $((T))$, and returning to processing (i), a restoration unit configured to arrange Z arrays $((L^0_j))$ having a length B to obtain an array having a size of B×Z, calculate and restore a secret pseudo-random permutation for tags of each of the arrays, calculate a secret pseudo-random permutation for tags of the array $((A'))$, apply the random permutation to $((A'))$, and then, restore the tags; and a table generation unit configured to arrange, in a hash table, only elements for which the tags corresponding to the array $((A'))$ and the tags corresponding to the table obtained by arranging the Z arrays $((L^0_j))$ having the length B coincide, and remove remaining elements to generate a secret hash table.

5. A reference system for referring to a secret hash table constructed by the secret hash table construction system according to claim 4, the reference system including a plurality of servers and referring to the secret hash table by a coordination protocol of the plurality of servers by using secure computation, wherein each of the plurality of servers comprises the processing circuitry configured to further implement:

a data sequence acquisition unit configured to use a concealed key value $((k))$ of data to be referred to as input of a pseudo-random function PRF, use the secret keys $((s^0))$ and $((s^1))$ to generate address values $((t^0))\leftarrow PRF(((k), ((s^0)))$ and $((t^1)\leftarrow PRF(((k)), ((s^1)))$ corresponding to the concealed key value $((k))$, restore address values $t^0$ and $t^1$ from the address values $((t^0))$ and $((t^1))$, and acquire data sequences $((A^{t-0}))$ and $((A^{t-1}))$ corresponding to the address values;

a comparison result acquisition unit configured to compare the concealed key value $((k))$ and key values included in an array $((A^{t-0}))\|((A^{t-1}))$ obtained by combining the data sequences $((A^{t-0}))$ and $((A^{t-1}))$ and calculate an array $((E))$ composed of the results of the comparison; and an inner product calculation unit configured to calculate an inner product of the data sequence $((A_r))$ and the array $(A^{t-0})\|(A^{t-1}))$.

6. A secret hash table construction method of constructing, through use of a plurality of servers, a secret hash table by a coordination protocol of the plurality of servers by using secure computation, wherein the secret hash table has a data structure configured to have B address values and store a maximum of Z pieces of data for each of the B address values, the secret hash table construction method comprising:

determining, for a concealed data sequence $((A))$, a pseudo-random function value $((addr_i))$ by using a key $((k_i))$ of each piece of data of the concealed data sequence $((A))$ as input of a pseudo-random function and a secret key $((s))$ as a secret key of the pseudo-random function, to determine an array $((addr))$ indicating a storage destination of each piece of the data;

generating an array $((addr_{dummy}))$ of concealed values and connecting the generated array $((addr_{dummy}))$ to the array $((addr))$ to determine an array $((addr'))\leftarrow((addr))\|((addr_{dummy}))$;

generating a sort permutation $((\sigma_1))$ for the array $((addr'))$ by using values included in the array $((addr'))$ as keys and applying the sort permutation $((\sigma_1))$ to the array $((addr'))$;

converting the array $((addr'))$ into an array with a sequence composed of first Z elements set to $((i))$ followed by $\alpha_i$ elements set to $((B))$, $\alpha_i$ being the number of i included in the array $((addr))$;

generating a sort permutation $((\sigma_2))$ for the converted array $((addr'))$ by using values included in the converted array $((addr'))$ as keys; and generating a table by generating dummy data $((empty))$ for a concealed data sequence $((\sim A))$ corresponding to the concealed data sequence $((A))$, imparting the generated dummy data $((empty))$ to the concealed data sequence $((\sim A))$, applying the sort permutations $((\sigma_1))$ and $((\sigma_2))$ to the data array imparted with the dummy data, and generating, as a secret hash table, a data sequence obtained by deleting the last N pieces of data from the sorted data array.

7. A reference method for referring to a secret hash table constructed by the secret hash table construction method according to claim 6, wherein a plurality of servers are used to refer to the secret hash table by a coordination protocol of the plurality of servers by using secure computation, the reference method comprising:

using a concealed key value $((k))$ of data to be referred to as input of a pseudo-random function PRF and using the secret key $((s))$ to generate an address value $((t))\leftarrow PRF(((k)), ((s)))$ corresponding to the concealed key value $((k))$, restoring an address value t from the address value $((t))$, and acquiring a data sequence $((A_t))$ corresponding to the address value;

comparing key values included in the data sequence $((A_t))$ and the concealed key value $((k))$ and calculating an array $((E))$ composed of the results of the comparison; and calculating an inner product of the data sequence $((A_t))$ and the array $((E))$.

8. The secret hash table construction method according to claim 6, wherein the secret hash table construction method constructs two secret hash tables having a data structure configured to have B address values and store a maximum of Z pieces of data for each of the B address values, and the generating of the table includes generating dummy data $((empty))$ for the concealed data sequence $((\sim A))$ corresponding to the concealed data sequence $((A))$, imparting the generated dummy data $((empty))$ to the concealed data sequence $((\sim A))$, applying the sort permutations $((\sigma_1))$ and $((\sigma_2))$ to the data array imparted with the dummy data, generating, as a first secret hash table, a data sequence obtained by deleting the last N pieces of data from the sorted data array, and controlling each of the units to construct a second secret hash table for a data sequence $((B))$ composed of the last N pieces of data of the sorted data array, by using a second secret key $((s_2))$ instead of the secret key $((s))$.

9. A secret hash table construction method of constructing, through use of a plurality of servers, a secret hash table by a coordination protocol of the plurality of servers by using secure computation, wherein the secret hash table has a data structure configured to have B address values and store a maximum of Z pieces of data for each of the B address values, the secret hash table construction method comprising:

determining, for a concealed data sequence ((A)), a pseudo-random function value $((addr^0_i))$ by using a key $((k_i))$ of each piece of data of the concealed data sequence ((A)) as input of a pseudo-random function and a secret key $((s^0))$ as a secret key of the pseudo-random function, to determine an array $((addr^0))$ indicating a storage destination of each piece of the data, and further determining, for the concealed data sequence ((A)), a pseudo-random function value $((addr^1_i))$ by using the key $((k_i))$ of each piece of the data of the concealed data sequence ((A)) as input of the pseudo-random function and a secret key $((s^1))$ as a secret key of the pseudo-random function, to determine an array $((addr^1))$ indicating a storage destination of each piece of the data;

generating arrays $((addr^0_{dummy}))$ and $((addr^1_{dummy}))$ of concealed values;

imparting tags $((1)), \ldots, ((N+BZ))$ to an array ((A')) obtained by connecting B×Z pieces of dummy data to the concealed data sequence ((A));

creating an array $((T))=(((t_1)), \ldots, ((t_{N+BZ})))$, where $((t_i))=(((i)), ((addr^0_i)), ((addr^1_i)), ((d)))$, ((i)) is each of the tags, $((addr^0_i))$ and $((addr^1_i))$ are i-th elements of the arrays $((addr^0))$ and $((addr^1))$, respectively, and ((d)) is a concealed value indicating whether data is dummy data;

repeating the following processing (i) to (ix) Z times,
  (i) newly generating a secret random permutation for the array ((T)) and applying the new secret random permutation to the array ((T)),
  (ii) generating a sort permutation using an element $((addr^0_i))$ of the array $((addr^0))$ as a key value and applying the generated sort permutation to the array ((T)),
  (iii) creating, for a sorted array ((T')), a secret array ((M)) obtained by marking data located at the beginning for each address value,
  (iv) creating a sort permutation for the array ((M)) and applying the created sort permutation to ((T')),
  (v) separating the last B pieces of data from ((T')), retaining the B pieces of data as an array $((L^0_j))$, and retaining the array shortened by B as ((T'')),
  (vi) sorting ((T'')) by using $((addr^1_i))$ as a key value, creating, for the sorted array, a secret array obtained by marking the data located at the beginning for each address value, creating a sort permutation for the created array, and applying the created sort permutation to ((T'')),
  (vii) separating the last B pieces of data from ((T'')) and retaining the B pieces of data as an array $((L^1_j))$,
  (viii) comparing respective elements of the arrays $((L^0_j))$ and $((L^1_j))$ in order from the beginning and exchanging elements when dummy data is present in $B^0_j$, and
  (ix) connecting $((L^1_j))$ to the array ((T'')), setting the connected array as a new array ((T)), and returning to processing (i), arranging Z arrays $((L^0_j))$ having a length B to obtain an array having a size of B×Z, calculating and restoring a secret pseudo-random permutation for tags of each of the arrays, calculating a secret pseudo-random permutation for tags of the array ((A')), applying the random permutation to ((A')), and then, restoring the tags; and arranging, in a hash table, only elements for which the tags corresponding to the array ((A')) and the tags corresponding to the table obtained by arranging the Z arrays $((L^0_j))$ having the length B coincide, and removing remaining elements to generate a secret hash table.

10. A reference method for referring to a secret hash table constructed by the secret hash table construction method according to claim 9, wherein
a plurality of servers are used to refer to the secret hash table by a coordination protocol of the plurality of servers by using secure computation, the reference method comprising:

using a concealed key value ((k)) of data to be referred to as input of a pseudo-random function PRF and using the secret keys $((s^0))$ and $((s^1))$ to generate address values $((t^0)) \leftarrow PRF(((k), ((s^0)))$ and $((t^1)) \leftarrow PRF(((k)), ((s^1)))$ corresponding to the concealed key value ((k)), restoring address values $t^0$ and $t^1$ from the address values $((t^0))$ and $((t^1))$, and acquiring data sequences $((A^{t-0}))$ and $((A^{t-1}))$ corresponding to the address values;

comparing the concealed key value ((k)) and key values included in an array $((A^{t-0}))\|((A^{t-1}))$ obtained by combining the data sequences $((A^{t-0}))$ and $((A^{t-1}))$ and calculating an array ((E)) composed of the results of the comparison; and calculating an inner product of the data sequence $((A_t))$ and the array $((A^{t-0}))\|((A^{t-1}))$.

* * * * *